(12) United States Patent
Butler et al.

(10) Patent No.: US 12,159,404 B2
(45) Date of Patent: Dec. 3, 2024

(54) DETECTING AND SEGMENTING REGIONS OF INTEREST IN BIOMEDICAL IMAGES USING NEURAL NETWORKS

(71) Applicant: Life Spine, Inc., Huntley, IL (US)

(72) Inventors: Michael S. Butler, St. Charles, IL (US); Vishnu Nallani, Hyderabad (IN); Sridhar Jayaraman, Hyderabad (IN); Rupesh Kumar Badam, Hyderabad (IN)

(73) Assignee: Life Spine, Inc., Huntley, IL (US)

( * ) Notice: Subject to any disclaimer, the term of this patent is extended or adjusted under 35 U.S.C. 154(b) by 283 days.

(21) Appl. No.: 17/746,240

(22) Filed: May 17, 2022

(65) Prior Publication Data

US 2022/0414869 A1    Dec. 29, 2022

(30) Foreign Application Priority Data

Jun. 24, 2021   (IN) .............................. 202141028361

(51) Int. Cl.
| | |
|---|---|
| *G06T 7/00* | (2017.01) |
| *G06T 7/11* | (2017.01) |
| *G06V 10/82* | (2022.01) |

(52) U.S. Cl.
CPC .............. *G06T 7/0012* (2013.01); *G06T 7/11* (2017.01); *G06V 10/82* (2022.01); *G06T 2207/30004* (2013.01)

(58) Field of Classification Search
USPC ....................................................... 382/128
See application file for complete search history.

(56) References Cited

U.S. PATENT DOCUMENTS

2016/0267326 A1*  9/2016 Yagev .................... G06V 20/39
2020/0401617 A1* 12/2020 Spiegel ................. G06F 16/587

OTHER PUBLICATIONS

Chen Liang-Chier et al: "MaskLab: Instance Segmentation by Refining Object Detection with Semantic and Direction Features", 2018 IEEE/CVF Conference on Computer Vision and Pattern Recognition, IEEE, Jun. 18, 2018 (Jun. 18, 2018), pp. 4013-4022.
International Search Report and Written Opinion in PCT/US2022/034541 dated Oct. 12, 2022 (15 pages).
Minaee Shervin et al: "Image Segmentation Using Deep Learning: A Survey", IEEE Transactions on Pattern Analysis and Machine Intelligence, IEEE Computer Society, USA, vol. 44, No. 7, Feb. 16, 2021 (Feb. 16, 2021) pp. 3523-3542.

(Continued)

*Primary Examiner* — Darryl V Dottin
(74) *Attorney, Agent, or Firm* — Foley & Lardner LLP

(57) ABSTRACT

Systems and methods for detecting regions of interests (ROIs) in biomedical images are described herein. A computing system may identify a biomedical image having an ROI. The computer system may apply an object detection model to the biomedical image. The object detection model may generate a feature map using the biomedical image. The object detection model may generate an anchor box corresponding to a portion of the pixels in the feature map. The computing system may apply an instance segmentation model to identify a segment of the biomedical image within the anchor box corresponding to the ROI. The computer system may provide an output based on the segment to identify the ROI in the biomedical image.

20 Claims, 12 Drawing Sheets

(56) References Cited

OTHER PUBLICATIONS

Ntisar Rizwan I Haque et al: "Deep learning approaches to biomedical image segmentation", Informatics in Medicine Unlocked, vol. 18, Jan. 1, 2020 (Jan. 1, 2020), p. 100297.
Ren Shaoqing et al: "Faster R-CNN: Towards Real-Time Object Detection with Region Proposal Networks", IEEE Transactions on Pattern Analysis and Machine Intelligence, IEEE Computer Society, USA, vol. 39, No. 6, Jun. 1, 2017.
Kaiming HE At al: "Mask R-CNN" 2017 IEEE International Conference on Computer Vision, Oct. 1, 2017, pp. 2982-2983.

* cited by examiner

DETECTING AND SEGMENTING REGIONS OF INTEREST IN BIOMEDICAL IMAGES USING NEURAL NETWORKS

CROSS REFERENCE TO RELATED APPLICATIONS

The present application claims the benefit of priority to Indian Provisional Patent Application No. 202141028361, titled "Detecting and Segmenting Regions of Interest in Biomedical Images Using Neural Networks," filed Jun. 24, 2021, the entirety of which is incorporated herein by reference.

BACKGROUND

A computing device may employ computer vision techniques to detect various objects contained in an image. Certain computer vision techniques may consume significant amounts of processing and memory resources and take a substantial duration of time to process.

SUMMARY

Aspects of the present disclosure are directed to systems, methods, and non-transitory computer-readable mediums for detecting Regions of Interest (ROIs) in biomedical images. One or more processors may identify a biomedical image derived from a sample. The biomedical image may have at least one ROI corresponding to an object in the sample. One or more processors may apply an object detection model to the biomedical image. The object detection model may include a feature extractor. The feature extractor may generate a feature map using the biomedical image. The feature map may have a plurality of pixels. The object detection model may include a region proposer. The region proposer may identify a first portion of the plurality of pixels in the feature map within a first anchor box. The region proposer may determine, based on the plurality of pixels in the first anchor box, whether the ROI is present in the first anchor box. The region proposer may generate, in accordance with an adjustment factor, a second anchor box corresponding to a second portion of the plurality of pixels in the feature map to identify the ROI in the biomedical image. The one or more processors may apply an instance segmentation model to the second anchor box to identify a segment of the biomedical image within the second anchor box corresponding to the ROI. The one or more processors may provide an output based on at least one of the second anchor box or the segment to identify the ROI in the biomedical image.

In some embodiments, one or more processors may determine the distance between the second anchor box for identifying the ROI and a third anchor box for identifying a second ROI in the biomedical image. In some embodiments, the one or more processors may provide information on the distance between the ROI and the second ROI.

In some embodiments, the region proposer may determine, based on the plurality of pixels in the first anchor box, an object type for the object corresponding to the ROI present in the first anchor box. In some embodiments, the one or more processors may provide information identifying the object type of the object corresponding to the ROI in the biomedical image.

In some embodiments, the region proposer may determine, for each anchor box of a plurality of anchor boxes, a confidence score that the ROI is present in the anchor box based on the plurality of pixels in the anchor box. In some embodiments, the region proposer may select, from the plurality of anchor boxes, the second anchor box for provision based on the confidence score. In some embodiments, the one or more processors may provide information identifying dimensions of the second anchor box corresponding to dimensions of the object from which the biomedical image is derived.

In some embodiments, the feature extractor may filter the biomedical image based on at least one of a shape or a color identified as corresponding to the object to generate the feature map. In some embodiments, the biomedical image may be derived from an X-ray scan of a vertebral column of the subject prior to, concurrent with, or subsequent to an operation. The ROI of the biomedical image may correspond to a disc in the vertebral column. In some embodiments, the one or more processors may provide an overlay to indicate the second anchor box to identify the disc corresponding to the ROI in the biomedical image.

In some embodiments, the one or more processors may train the object detection model using a training dataset. The training dataset may include an example biomedical image derived from an example sample and a ground anchor box labeling at least one ROI corresponding to an object of the example sample.

Aspects of the present disclosure are directed to systems, methods, and non-transitory computer-readable medium for training models to detect regions of interests (ROIs) in biomedical images. One or more processors may identify a training dataset. The training data set may have a biomedical image derived from a sample. The biomedical image may have at least one ROI corresponding to an object in the sample. The training dataset may have a ground anchor box labeling the at least one ROI corresponding to the object. The one or more processors may apply the object detection model to the biomedical image. The object detection model may include a feature extractor. The feature extractor may generate a feature map using the biomedical image, the feature map having a plurality of pixels. the object detection model may include a region proposer. The region proposer may identify a first portion of the plurality of pixels in the feature map within a first anchor box. The region proposer may determine, based on the plurality of pixels in the first anchor box, whether the ROI is present in the first anchor box. The region proposer may generate, in accordance with an adjustment factor, a second anchor box corresponding to a second portion of the plurality of pixels in the feature map to identify the ROI in the biomedical image. The one or more processors may compare the second anchor box with the ground anchor box to determine a loss metric. The one or more processors may update at least one kernel of the feature extractor or the region proposer in the object detection model based on the loss metric.

In some embodiments, the training dataset may include a ground segment labeling the at least one ROI within ground anchor box for the biomedical image. In some embodiments, the one or more processors may apply an instance segmentation model to the second anchor box to identify a segment of the biomedical image within the second anchor box corresponding to the ROI. In some embodiments, the one or more processors may compare the segment identified by the instance segmentation model and the ground segment to determine a second loss metric. In some embodiments, the one or more processors may update at least one second kernel of the instance segmentation model based on the second loss metric.

In some embodiments, the region proposer of the object detection model may generate an intersection metric based on comparing the first anchor box with the ground anchor box. In some embodiments, the region proposer may determine, based on the intersection metric, whether the ROI is present in the first anchor box.

In some embodiments, the region proposer of the object detection model may identify, from a plurality of anchor boxes, a subset of anchor boxes based on an intersection metric between each anchor box of the subset and the ground anchor box. In some embodiments, the region proposer may determine, for each anchor box of the subset of anchor boxes, a confidence score that the ROI is present in the anchor box based on the plurality of pixels in the anchor box. In some embodiments, the region proposer may select, from the plurality of anchor boxes, the second anchor box for provision based on the confidence score.

In some embodiments, the training dataset may include a plurality of biomedical images. Each of the plurality of biomedical images may be derived from the sample in accordance with a corresponding acquisition parameter. In some embodiments, the one or more processors may update the at least one kernel of the feature extractor to filter the biomedical image based on at least one of a shape or a color identified as corresponding to the object to generate the feature map.

In some embodiments, the biomedical image of the training dataset may be derived from an X-ray scan of a vertebral column of the subject prior to, concurrent with, or subsequent to an operation. In some embodiments, one or more processors may apply, subsequent to convergence of the models to a second biomedical image acquired via a scan of a second sample to identify at least one second ROI corresponding to a second object in the second sample in the second biomedical image.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Presented herein is a machine learning framework that can compare the pre-op X-ray reports with post-op X-rays to identify the location of the discs and measure the differences in order to predict the discharge, rehabilitation, and possible readmissions, among others.

Figure 1:
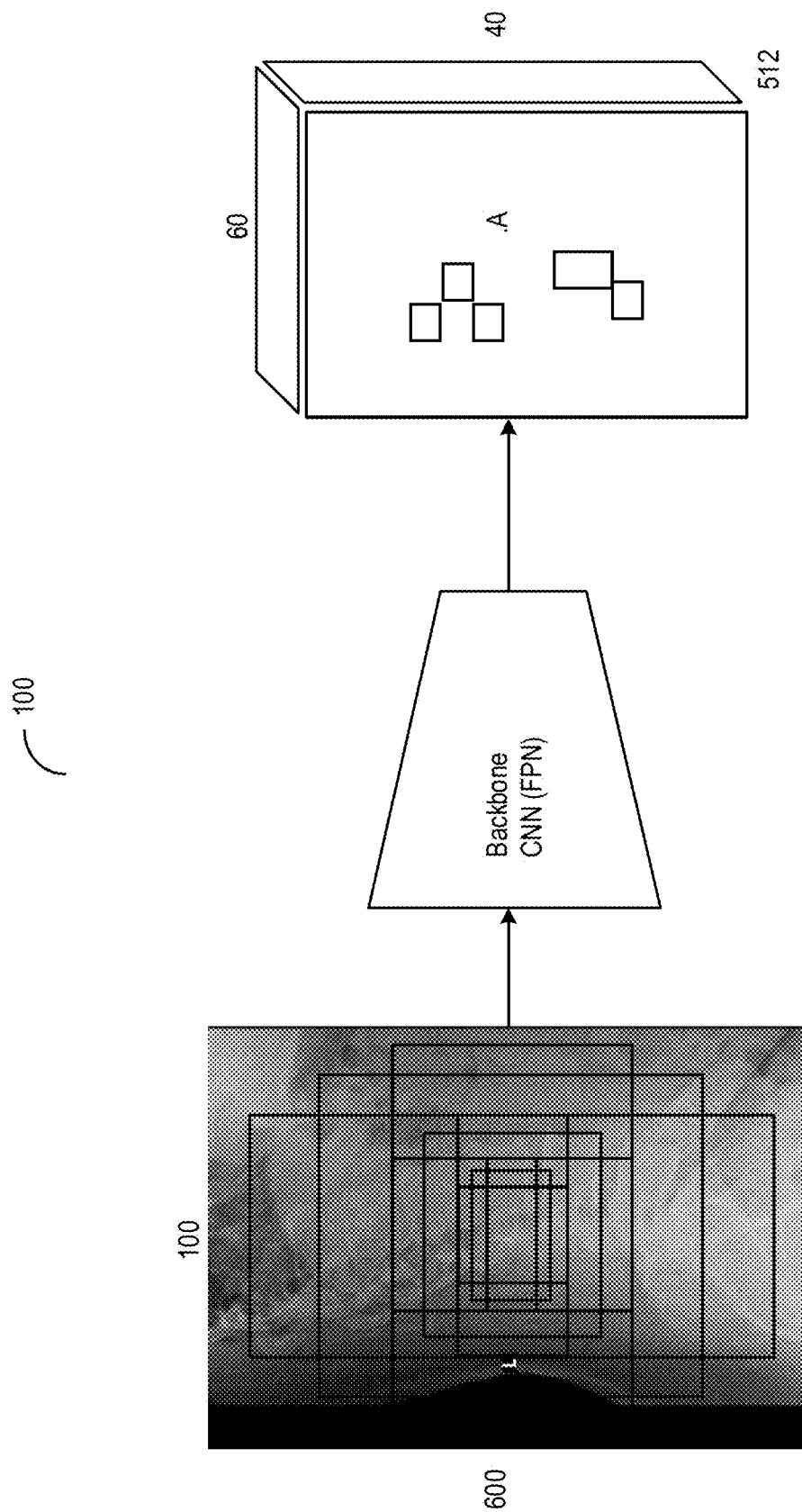
FIG. 1 depicts a block diagram of a deep convolutional network architecture for detecting regions of interest (ROIs) in biomedical images in accordance with an illustrative embodiment.

Referring now to FIG. 1, depicted is a block diagram of a deep convolutional network architecture 100 for detecting regions of interest (ROIs) in biomedical images. A Faster Region Based Convolutional Neural Networks (R-CNN) may be used. This architecture 100 may include a region proposal network (RPN) as a region proposal algorithm and the Fast R-CNN as a detector network. R-CNN solves the CNN localization problem by operating within the 'recognition using regions' paradigm. The R-CNN may include: (a) region proposal algorithm to generate 'bounding boxes' or locations of possible objects in the image, (b) a feature generation stage to obtain features of these objects using a CNN, (c) a classification layer to predict which class this object belongs to, and (d) a regression layer to make the coordinates of the object bounding box more precise. While the present disclosure specifically discusses using deep convolutional neural networks, it should be understood that, in various embodiments, other types of neural networks or machine learning methodologies may be utilized.

In the architecture 100, the Region Proposal Network (RPN) may start with the input image being fed into the backbone convolutional neural network. The input image may be first resized such that its shortest side is 600 px with the longer side not exceeding 1000 px. The backbone network may then the input image into vectors and to feed next level of layers. For every point in the output feature map, the network may learn whether an object is present in the input image at its corresponding location and estimate its size. This may be done by placing a set of 'Anchors' on the input image for each location on the output feature map from the backbone network.

As the network moves through each pixel in the output feature map, the model may check whether these k corresponding anchors spanning the input image contain objects and refine these anchors' coordinates to give bounding boxes as 'object proposals' or regions of interest. First, a 3×3 convolution with 512 units may be applied to the backbone feature map, to give a 256-d feature map for every location. This may be followed by two sibling layers: a 1×1 convolution layer with 18 units for object classification, and a 1×1 convolution with 36 units for bounding box regression. The 18 units in the classification branch may yield an output of size (H, W, 18). This output may be used to give probabilities of whether each point in the backbone feature map (size: H×W) contains an object within all 9 of the anchors at that point. The 36 units in the regression branch may give an output of size (H, W, 36). This output is used to give the 4 regression coefficients of each of the 9 anchors for every point in the backbone feature map (size: H×W). These regression coefficients may be used to improve the coordinates of the anchors that contain objects.

Regarding the neural networks, the backbone network may be the initial stage of the entire network where the featurization happens. After the featurization, the converted image may go through various networks such as RPN. In RPN, the model may generate regions proposals by selective search and then it will be forwarded for classification and detection of bounding boxes. The classification layer may output whether the object is found or not for the anchor. The regression layer may output the detected object bounding box co-ordinates. In the object detection model, the network layers may be modified, so that the layer can fit into the network properly. By using this network, the data may be fine-tuned to be able to detect implants. Subsequently, the detected ROI proposals from the RPN may be fed to a mask head to generate the vertebra mask within the proposed box. In the process of hyper parameter tuning, the biomedical images may be labeled using an annotator tool.

Regarding the training dataset used to train the model, the data may be cleaned beforehand. For example, images from various angles with different lighting conditions may be obtained. In addition, images to be included in the training dataset may be controlled for quality and focus. As little as 200 images per class may be sufficient for training. However, for more complex and nuance categories, 500 or more images for training may be used. Having the diverse dataset including complex images with different angles may lead to the model performing well in outputting.

Figure 2:
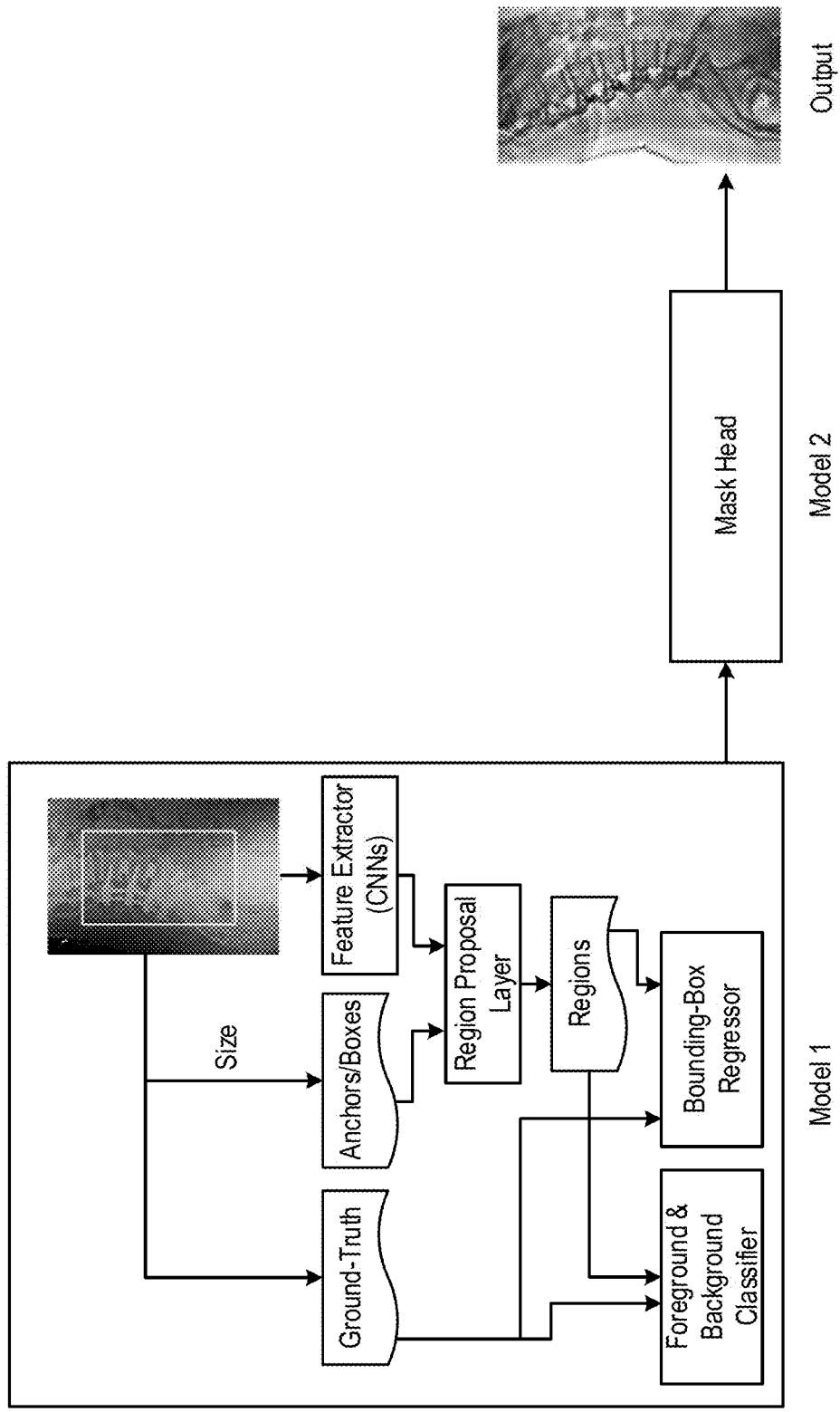
FIG. 2 depicts a block diagram of a model for detecting regions of interest (ROIs) in biomedical images in accordance with an illustrative embodiment.

Referring now to FIG. 2, depicted is a block diagram of a convolutional neural network-based model 200 for detecting regions of interest (ROIs) in biomedical images. The model 200 may be comprised of three parts. First, the model may include a convolutional network. In these layers, the filter is trained to be able to extract the appropriate features of the image. The filters may be trained to extract the appropriate features for implants and vertebrae, such as shapes and color that correlate with the implants and vertebrae in an X-ray image. A feature pyramid network (FPN) may be used to generate multiple feature map layers with better quality information. The FPN may be composed of convolutional networks that handles feature extraction and image reconstruction. As the feature extraction is progressing, the spatial resolution of the layer may decrease. With more high-level structures detected, the semantic value for each layer may increase.

Second, the model may include a region proposal network (RPN). The proposals for the region where the object lies may be generated. A small convolutional network may be slid over a feature map generated by the first convolutional network. The RPN may determine the possibility of an anchor being background or foreground and refine an anchor box. The RPN may perform two different type of predictions: the binary classification and the bounding box regression adjustment. For training, all anchors may be used to perform two types of predictions. The anchor boxes that overlap a ground-truth object with an Intersection over Union (IoU) bigger than 0.5 may be determined to be "foreground." Conversely, those that do not overlap any ground truth object or have less than 0.1 IoU with ground-truth objects may be determined to be "background."

Third, the model may include layers to perform bounding boxes and classification. Another fully connected neural network may be used to process the regions proposed by the RPN as an input. The classifier may predict object class and a regressor may determine bounding boxes. Non-Maximum Suppression may be used in faster R-CNN, to sort all the bounding boxes by confidence score and discard boxes with low confidence scores. If there are any remaining bounding boxes, the boxes with the highest score may be selected in accordance with greedy algorithm. Remaining boxes with high IoU (i.e., >0.5) may be skipped with previously selected anchor box. Using this model, the result may be 85% accuracy in object identification (e.g., disc in the X-ray scan). Subsequently, with instance segmentation model, detected ROI proposals from RPN may be fed to mask head to generate the vertebra mask within the proposed box.

Regarding training and loss function, all anchor boxes that cross the boundaries of the image may be ignored, so that such anchor boxes do not contribute to the loss. An anchor box may be determined to be a 'positive' sample if it satisfies either of these two conditions: (i) the anchor having the highest IoU (Intersection over Union), which may be a measure of overlap, with a ground truth box; or the anchor having an IoU greater than 0.7 with any ground truth box. The same ground truth box may be used to assign multiple anchors to positive labels. On the other hand, an anchor is labelled 'negative' if the IoU with all ground truth boxes is less than 0.3. The rest of the anchors (neither positive nor negative) are disregarded for RPN training. The output may produce co-ordinates of bounding boxes and class score.

With respect to detection of implants, the model of Faster R-CNN may be trained using the x-ray images. In the faster R-CNN, the backbone network may break the image into features. While training, all the anchors at that crosses the boundary may be ignored to reduce the loss. Anchor may be determined to be as Disc if the ROI has highest IoU with the ground truth box the threshold crosses 0.7 with any ground truth box. Otherwise, anchor may be determined to be not Disc if the threshold is very less.

In addition, with respect to instance segmentation of vertebra, the model of mask R-CNN may also be trained using x-ray images. In the mask R-CNN, the backbone network may break the image into features. The mask loss, similarly to the classification loss, may penalize erroneous per-pixel binary classifications. The mask loss may be calculated differently for each of the region of interest (ROI). The mask R-CNN may encode a binary mask per class for each of the ROIs. The mask loss for a specific RoI may be calculated based only on the mask corresponding to its true class, which may prevent the mask loss from being affected by class predictions. The anchor may be determined to be a vertebra if the ROI has highest IoU with the ground truth mask the threshold crosses 0.7, with any ground truth mask. Otherwise, the mask may be determined to be not vertebra if the threshold is any less.

In application, pre-surgery and post-surgery scanned X-ray images may be applied to the model. When an image is uploaded, the models may be run to detect vertebra or implant within the image. In the back end, measures of bounding boxes, class labels, and masks may be generated as output. Based on the model output, landmarks may be calculated for each vertebra detected within the mask. Now the instance segmentation model may calculate midpoints on each edge that connects adjacent landmarks (vertices) to derive the centroid of the Vertebra. The tables under the images may contain the information about distances, among other information. The tables may also include information on spine structure, implant related information, patient demographic data, and other pathology data, among others.

Figure 3:
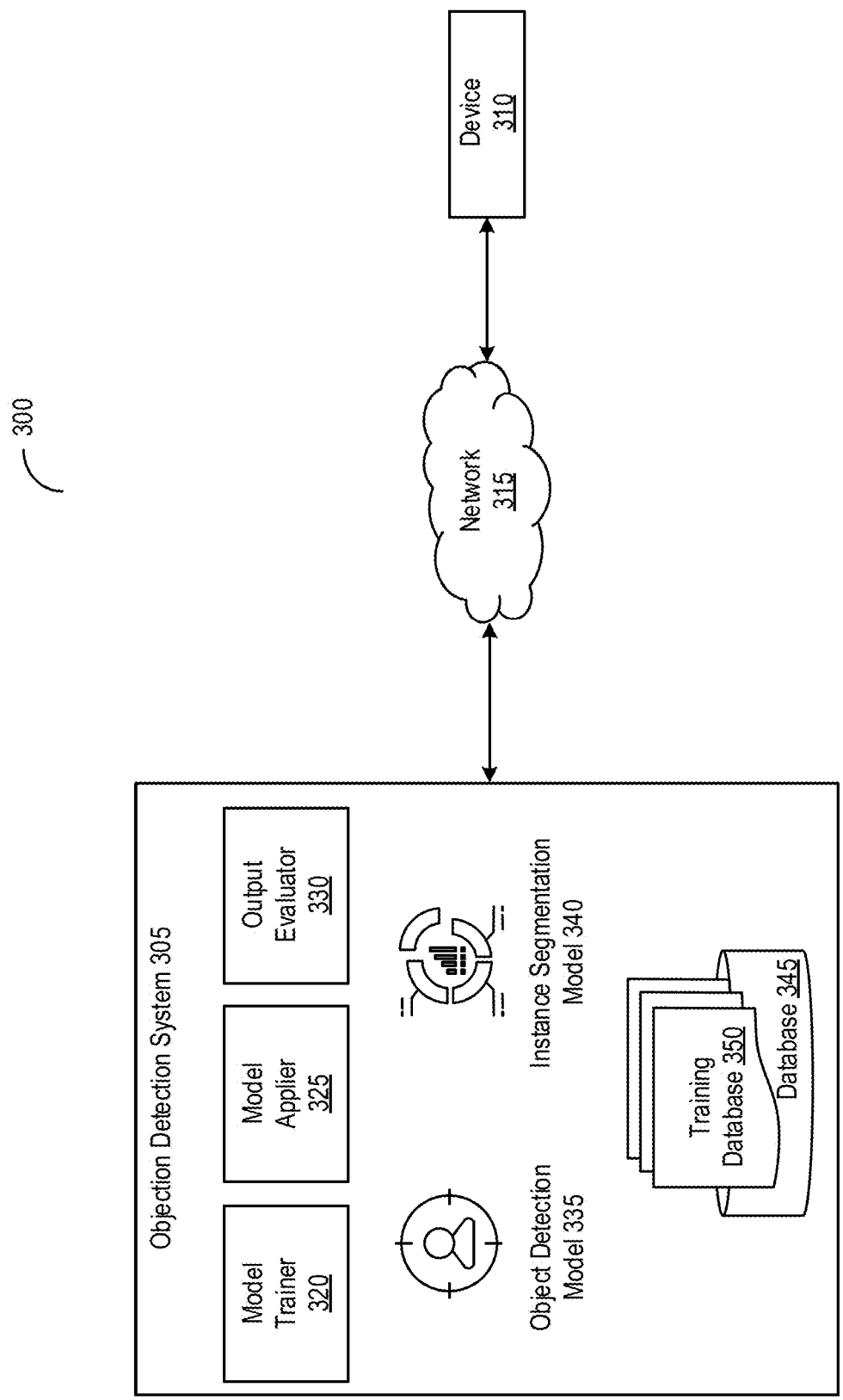
FIG. 3 depicts a block diagram of a system for detecting and segmenting the regions of interest (ROIs) in biomedical images in accordance with an illustrative embodiment.

Referring now to FIG. 3, depicted is a block diagram of a system 300 for detecting regions of interest (ROIs) in biomedical images. In overview, the system 300 may include at least one device 310 communicatively coupled to each other via at least one network 315. The object detection system 305 may include at least one model trainer 320, at least one model applier 325, at least one output evaluator 330, at least one object detection model 335, at least one instance segmentation model 340, and at least one database 345. In some embodiments, the object detection model 335 and the instance segmentation model 340 may form at least one model. The database 345 may store, maintain, or otherwise include a training dataset 350. Each of the components of the system 300 (e.g., the object detection system 305, its components, and the device 310) may be implemented using hardware (e.g., one or more processors coupled with memory) or a combination of hardware and software. The network 315 may be any medium for establishing communications between one or more components of the object detection system 305 and the device 310, such as a direct wired connection, a near-field communication (NFC), a local area network (LAN), or a wide-area network (WAN) (e.g., the Internet), among others.

The object detection system 305 itself and the components therein, such the model trainer 320, the model applier 325, and the output evaluator 305, may have a training mode and a runtime mode (sometime referred herein as an evaluation mode). Under the training mode, the object detection system 305 may initiate, establish, and train the object detection model 335 and the instance segmentation model 340 using the training dataset 350. Under the runtime mode, the object detection and instance segmentation models may already have been trained and the object detection system 305 may apply it to newly acquired biomedical images to detect objects therein.

Figure 4:
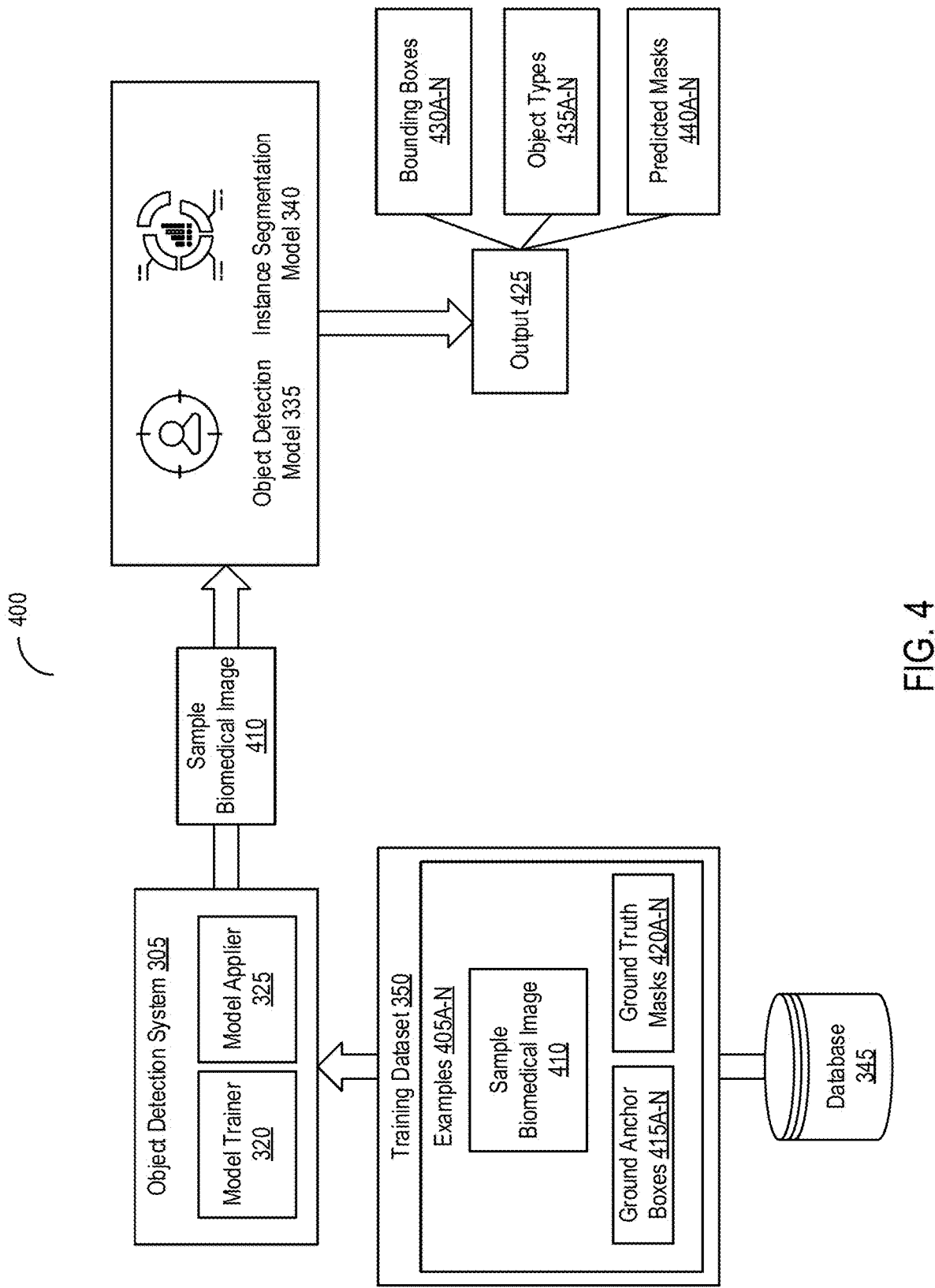
FIG. 4 depicts a sequence diagram of a process of training the object detection model and instance segmentation model in the system for detecting ROIs in biomedical images in accordance with an illustrative embodiment.

Referring now to FIG. 4, depicted is a sequence diagram of a process 400 of training the object detection model 335 and instance segmentation model 350 in the system 300 for detecting ROIs in biomedical images. Under process 400, the model trainer 320 running on the object detection system 305 may train the object detection model 335 and instance segmentation model 340. To train the models, the model trainer 320 may apply supervised learning (e.g., as depicted), weakly supervised learning, or unsupervised learning (e.g., using object localization), among others. The model trainer 320 may initialize or establish the object detection model 335 and instance segmentation model 340. In initializing, the model trainer 3205 may assign random values to set of kernels defined in the object detection model 335 and instance segmentation model 340.

The model trainer 320 may identify the training dataset 350 for training the object detection model 335 and instance segmentation model 340. In some embodiments, the model trainer 320 may access the database 345 to retrieve or identify the training dataset 350. The training dataset 350 may identify or include a set of examples 405A-N (hereinafter generally referred to as examples 405). Each example 405 may include at least one sample biomedical image 410. The sample biomedical image 410 of each example 405 in the training dataset 350 may be acquired or derived from a section or volume of a biological sample in accordance with imaging techniques relying on an electromagnetic radiation. The electromagnetic radiation may be in the form of an X-ray, including soft X-ray, hard X-ray, gamma ray, or magnetic field, among others. The imaging techniques may include a projectional radiography, computer tomographic (CT) scan, fluoroscopy, and magnetic resonance imaging (MM), among others.

The biological sample for the biomedical image 410 may include, for example, a human or other animal, among others. For instance, the sample biomedical image 410 may be an X-ray scan of a portion of a vertebral column of a human subject. Across the examples 405, each sample biomedical images 410 may have been acquired or derived from the biological sample with differing acquisition parameters. The acquisition parameters may include angle of acquisition, brightness, focus, contrast, and magnification level, among others. The dimensions of the sample biomedical image 410 may range between 400 to 800 pixels in height and 800 to 1200 pixels in width. The sample biomedical images 410 may be, for example, high definition (HD) images with low distortion in differing lighting conditions taken pre-surgery or post-surgery.

In addition, each example 405 in the training dataset 350 may identify or include a set of ground anchor masks 415A-N (hereinafter generally referred to as ground anchor box 415) for the sample biomedical image 410. Each ground anchor box 415 may define, identify, or otherwise label an outline about a region of interest (ROI) in the sample biomedical image 410. The shape of the outline may be rectangular, circular, polygonal, or any other form, among others. The ROI in the sample biomedical image 410 may correspond to an object in the subject from which the sample biomedical image 410 is derived. For example, the ROI may correspond to at least one vertebra or at least one implant in the vertebral column of a human subject. The ground anchor box 415 may define a rectangular outline in addition to a mask to encompass the ROI. The outline of the ground anchor box 415 may be defined coordinates (e.g., x and y coordinates) relative to the dimensions of the sample biomedical image 410. For example, the ground anchor box 415 may be a rectangular outline defined in terms the coordinates for the top left and bottom right corners; to enclose one of the ROIs in the sample biomedical image 410. The ground anchor box 415 may have been generated manually of the training dataset 350. For instance, the ground anchor box 415 may be created by a clinician examining the X-ray scan for Vertebrae of the spinal column depicted therein. Other shapes may be used for the ground anchor box 415.

Each example 405 may also include a set of ground truth masks 420A-N (hereinafter generally referred to as a ground truth mask 420) for the sample biomedical image 410. The ground truth masks 420 may. Each ground truth mask 420 may define, identify, or otherwise label a set of pixels corresponding to an outline or shape of the ROI within the ground trust mask 420. For example, the ground truth mask 420 may be a binary classification of pixels for a shape of vertebra disc, not particular to the one depicted in the sample biomedical image 410 or any of the ground anchor boxes 415. For example, the ground truth mask 420 may define the coordinates (e.g., x and y pixel coordinates) for the ROI corresponding to at least one vertebra in the vertebral column within the associated ground anchor box 415. The coordinates for the ROI may have been inputted or generated using an annotation tool for labeling the sample biomedical image 410.

In some embodiments, the ground truth mask 420 may identify the ROI in the sample biomedical image 410. In some embodiments, each ground truth mask 420 may be associated with a corresponding ground anchor mask 415. The ground truth mask 420 may identify the ROI within the associated ground anchor mask 415. In some embodiments, the ground truth mask 420 may identify the outline of the ROI within the associated ground anchor box 415 or the sample biomedical image 410. Different from the outline identified in the ground anchor box 415, the outline identified by the ground truth mask 420 may be freeform or irregular in shape.

In some embodiments, the example 405 may include an annotation associated with the sample biomedical image 410, the set of ground anchor box 415, or the set of ground truth masks 420. For ROI in the sample biomedical image 410, the annotation may identify an object type of the object corresponding to the ROI of the sample biomedical image 410. The annotation may identify the object type for the ROI identified in the ground anchor box 415 or the ground truth mask 420. The object type may identify or define a classification of the object in the biological sample. For example, the object type may define various portions of a vertebral column, such as a vertebra, disc, body, a facet, a foramen, a pedicle, a ligament, and coccyx, among others. The annotation may also identify whether the sample biomedical image 410 was acquired pre-surgery, mid-surgery, or post-surgery on the biological sample. The data in the example 405 may be used to train the object detection model 335 and instance segmentation model 340 to identify or measure various characteristics in the sample biomedical image 410. In some embodiments, the annotations in the example 405 may include foraminal height, lordosis, vessel size, vessel location, adjacent level issues, and other sequelae, among other characteristics. The annotations may also specify whether the data is pre-operation or post-operation, among others. The annotations may also include data for assessing a variety of conditions, such as neurological aneurysm, cardiac occlusions, and major vessel calcification, among others.

With the identification, the model applier 325 may apply the object detection model 335 and instance segmentation model 340 to the sample biomedical image 410 from each example 405 of the training dataset 350. In some embodiments, the model applier 325 may modify (e.g., resize or crop) the dimensions of the sample biomedical image 410 to conform to the input of the object detection model 335 and instance segmentation model 340. For example, the model applier 325 may resize or reconstruct the sample biomedical image in any dimension (e.g., 410 to 600×1000 pixels). To apply, the model applier 325 may feed the sample biomedical image 410 into the object detection model 335 and instance segmentation model 340. The model applier 325 may apply one or more kernels (sometimes herein referred to as weights or parameters) of the object detection model 335 and instance segmentation model 340 to the sample biomedical image 410 to produce or generate at least one output 425.

The output 425 may identify or include a set of bounding boxes 430A-N (hereinafter generally referred to as predicted mask 430), a corresponding set of object types 430A-N (hereinafter generally referred to as object types 435), and a corresponding set of predicted masks 440A-N (hereinafter generally referred to as predicted masks 440). Each bounding box 430 may define or identify an outline (e.g., a rectangular outline) about a corresponding ROI in the sample biomedical image 410. For each bounding box 430, the corresponding object type 435 may define or identify the classification of the object depicted in the ROI identified within the bounding box 430. In addition, the predicted mask 440 may identify at least a portion of the coordinates (e.g., pixel coordinates) corresponding to the ROI within the bounding box 430. Details of the object detection model 335 and instance segmentation model 340 are discussed herein below.

Figure 5A:
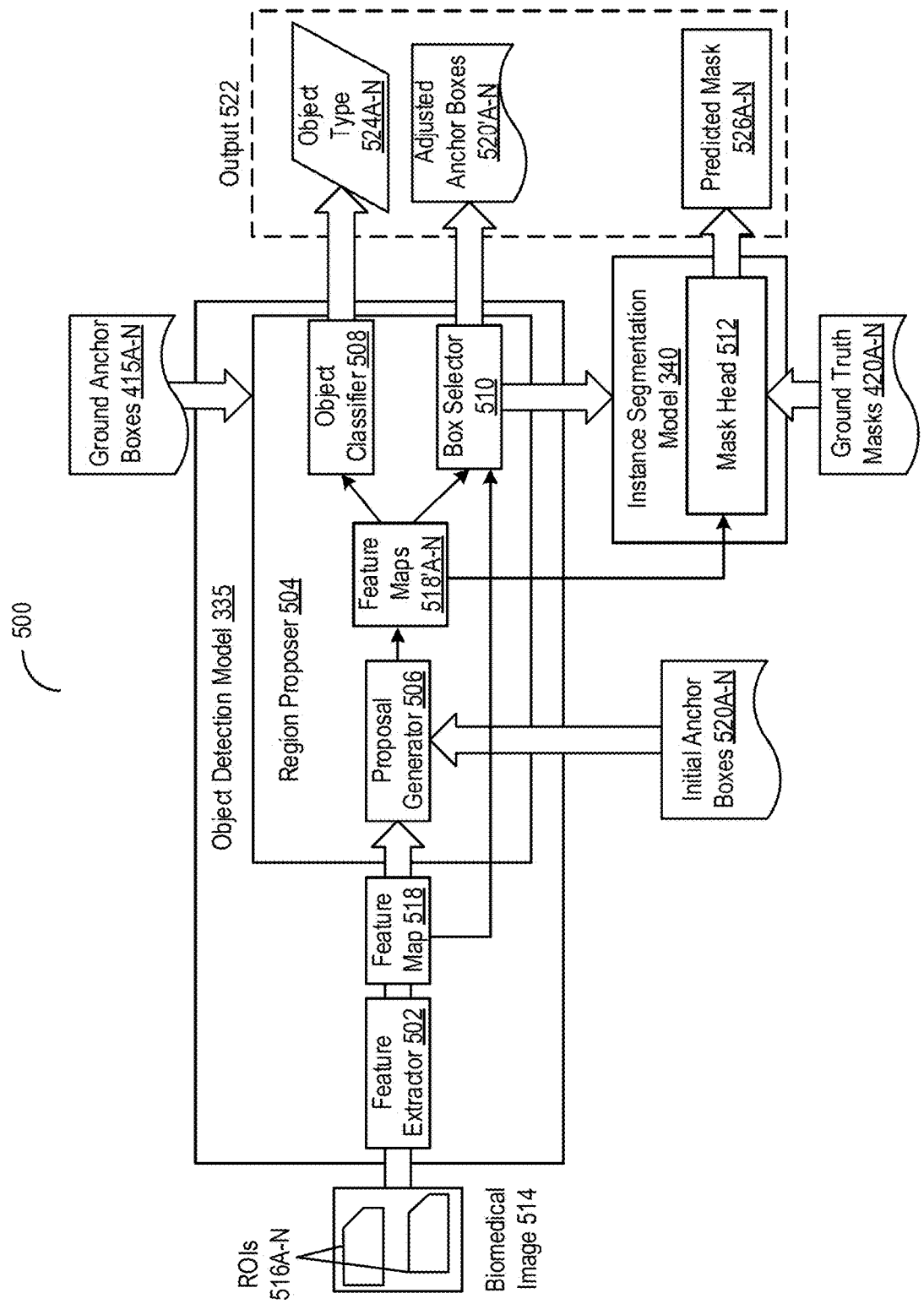
FIG. 5A depicts a block diagram of a network architecture for the object detection model and the instance segmentation model in the system for detecting ROIs in biomedical images in accordance with an illustrative embodiment.

Referring now to FIG. 5A, depicted is a block diagram of a network architecture 500 for the object detection model 335 and instance segmentation model 340 in the system 300 for detecting ROIs in biomedical images. In the network architecture 500, the object detection model 335 may include at least one feature extractor 502 and at least one region proposer 502, among others. The region proposer 520 may include at least one proposal generator 506, at least one object classifier 508, and at least one box selector 510, among others. In some embodiments, the region proposer 504 may also include the feature extractor 502 in addition to the proposal generator 506, the object classifier 508, and the box selector 510. The instance segmentation model 340 may include at least one mask head 512. In some embodiments, the instance segmentation model 340 may include an instance of the feature extractor 502. In some embodiments, the object detection model 335 and instance segmentation model 340 may be in accordance with a region proposal network (RPN). The object detection model 335 may be used to detect whether an ROI (e.g., an area containing an implant within an image of a vertebra) exists within an biomedical image. The image segmentation model 340 may be used to classify individual pixels as the ROI (e.g., pixels corresponding to the implant) within the biomedical image. Details of the various components of the object detection model 335 and instance segmentation model 340, such as the feature extractor 502, the region proposer 504, the proposal generator 506, the object classifier 508, and the box selector 510, and the mask head 512, among others are described herein in conjunction with FIGS. 5B-G.

The feature extractor 502 (sometimes herein referred to as a backbone network) may have at least one input and at least one output. The input for the feature extractor 502 may be the input for the overall object detection model 335 and may include at least one biomedical image 514 (e.g., the sample biomedical image 410). The biomedical image 514 may have one or more ROIs 516A-N (hereinafter generally referred to as ROIs 516). The output of the feature extractor 502 may be at least one feature map 518. The feature map 518 may have a set of pixels corresponding to a lower dimensional representation of the input biomedical image 514. In some embodiments, the feature extractor 502 may be trained to filter the biomedical image 514 to generate the feature map 518 based on characteristics corresponding to ROIs. The characteristics may include, for example, a shape, a curvature, and a color, among others. The input and the output of the feature extractor 502 may be related via a set of kernels (sometimes herein referred to as parameters or weights). In some embodiments, the set of kernels included in the feature extractor 502 may define a feature pyramid network (FPN) framework using convolutional neural networks (CNN) during the process of feature extraction.

The proposal generator 506 of the region proposer 504 may include at least one input and at least one output. The inputs may include the feature map 518 generated by the feature extractor 502 and a set of initial anchor boxes 520A-N (hereinafter generally referred to as initial anchor boxes 520). The initial anchor boxes 520 may identify or define a set of outlines (e.g., rectangular boundaries) for candidate locations of ROIs 516 in the biomedical image 514 and may differ in dimensions and locations on the biomedical image 514. The set of initial anchor boxes 520 may be pre-generated, stored, and maintained on the database 345. The output of the proposal generator 506 may include a set of feature maps 518'A—N (hereinafter generally referred to as feature maps 518'). Each feature map 518' (sometimes herein referred to as proposals or proposed regions) may be an output generated using the feature map 518 and a corresponding initial anchor box 520. The inputs and the output of the proposal generator 506 may be related via a set of kernels (sometimes herein referred to as parameters or weights). In some embodiments, the set of kernels included in the proposal generator 506 may define a convolutional layer.

The object classifier 508 of the region proposer 504 may include at least one input and at least one output. The input of the object classifier 508 may include the set of feature maps 518' produced by the proposal generator 506. In some embodiments, the input of the object classifier 508 may also include the feature map 518 generated by the feature extractor 502. The output of the object classifier 508 may include a set of object types 520A-N (hereinafter generally referred to as object types 520). Each object type 524 may define or identify the classification of the object of the ROI in the corresponding feature map 518'. Each object type 524 may be generated by the object classifier 508 using the corresponding feature map 518' produced by the proposal generator 506. The set object types 520 may be an output 522 (e.g., object types 435 of the output 420) of the overall object detection model 335. The inputs and the outputs of the object classifier 508 may be related via a set of kernels (sometimes herein referred to as parameters or weights). In some embodiments, the set of kernels included in the object classifier 508 may define an activation layer.

The box selector 510 of the region proposer 504 may include at least one input and at least one output. The input of the box selector 510 may include the set of feature maps 518' produced by the proposal generator 506. In some embodiments, the input of the box selector 510 may also include the feature map 518 generated by the feature extractor 502 and the set of initial anchor boxes 520. The output of the object classifier 508 may include a set of adjusted anchor boxes 520'A-N (hereinafter generally referred to as adjusted anchor boxes 520'). Each anchor box 520' may be generated by the box selector 510 using a corresponding feature map 518' and the initial anchor box 520. The set of adjusted anchor boxes 520' may be one of the outputs 522 (e.g., bounding boxes 430 of the output 425) of the overall object detection model 335. The inputs and the outputs of the box selector 510 may be related via a set of kernels (sometimes herein referred to as parameters or weights). In some embodiments, the set of kernels included in the box selector 510 may define a regression layer.

The mask head 512 the instance segmentation model 340 may include at least one input and at least one output. The input of the mask head 512 of the instance segmentation model 340 may include the adjusted anchor boxes 520 generated by the box selector 510. In some embodiments, the input of the mask head 512 may include the set of feature maps 518' produced by the proposal generator 506. The output of the mask Head 512 may include a set of predicted mask 526A-N (hereinafter generally referred to as predicted mask 526). Each predicted mask 526 may be generated by the mask head 512 using a corresponding adjusted anchor box 520 or a portion of the feature map 516' corresponding to the adjusted anchor box 520. The set of predicted mask 526 may be one of the outputs 522 (e.g., the predicted mask 440 of the output 425) of the overall instance segmentation model 340. The inputs and the outputs of the mask head 512 may be related via a set of kernels (sometimes herein referred to as parameters or weights).

In context, the model applier 325 may select, obtain, or otherwise identify the biomedical image 514 (e.g., the sample biomedical image 410 of the example 405). The biomedical image 514 may include a set of pixels depicting an object of a biological sample. With the identification, the model applier 325 may feed the biomedical image 514 as input to the feature extractor 502. The model applier 325 may apply the set of kernels defined by the feature extractor 502 to the biomedical image 514. Using the biomedical image 514, the feature extractor 502 may determine, produce, or otherwise generate the feature map 518. The feature map 518 may include a set of pixels of a lower dimension representation of the biomedical image 514 in accordance with the set of kernels in the feature extractor 502. For example, the feature map 518 may represent one or more characteristics of the input biomedical image 514, such as shapes, curvatures, or colors of the depiction therein. The model applier 325 may obtain or identify the feature map 518 produced by the feature extractor 502.

Continuing on, the model applier 325 may retrieve or identify the set of initial anchor boxes 520 for the biomedical image 514. Once identified, the model applier 325 may feed the feature map 518 from the feature extractor 502 and the set of initial anchor boxes 520 as the input into the proposal generator 506. The model applier 518 may apply the set of kernels defined by the proposal generator 506 to the feature map 518 and each initial anchor box 520. For each initial anchor box 520, the proposal generator 506 may identify a subset of pixels in the feature map 518 within the corresponding initial anchor box 520. In accordance with the set of kernels, the proposal generator 506 may generate a corresponding feature map 518'. The feature map 518' may have the subset of pixels defined by the corresponding initial anchor box 520 and may be of a lower dimension that the input feature map 518. The model applier 518 may iteratively apply each initial anchor box 520 in the set and may obtain or identify each feature map 518' generated using the initial anchor box 520 over the input feature map 518.

With the production, the model applier 325 may feed each of the feature maps 518' from the proposal generator 516 into the input of the object classifier 508. The model applier 325 may process the feature map 518' in accordance with the set of kernels defined in the object classifier 508. Based on the pixels included in the feature map 518', the object classifier 508 may determine whether at least one of the ROIs 516 is present in the feature map 518'. When the ROI 516 is determined to be not in the feature map 518', the object classifier 508 may identify the portion of the biomedical image 514 corresponding to the initial anchor box 520 as background. Conversely, when the ROI 516 is determined to be in the feature map 518', the object classifier 508 may identify the portion of the biomedical image 514 corresponding to the initial anchor box 520 as foreground. In addition, the object classifier 508 may determine the object type 524 for the object corresponding to the ROI 516 based on the pixels included in the feature map 518'. The model applier 325 may obtain, retrieve, or otherwise identify the set of object types 524 as the output 522 from the object detection system 305.

In conjunction, the model applier 325 may feed each of the feature maps 518' from the proposal generator 506 into the input of the box selector 510. In some embodiments, the model applier 325 may also feed the feature map 518 generated by the feature extractor 502 into the box selector 510. The model applier 325 may process the feature maps 518' (and feature map 518) using the set of kernels defined in the box selector 510. In accordance with regression coefficients, the box selector 510 may generate an adjusted anchor box 518' for each initial anchor box 520. In some embodiments, the box selector 510 may shift, offset, or otherwise modify the coordinates defining the initial anchor box 520 used to generate the corresponding feature map 518' to produce the adjusted anchor box 518'. Each adjusted anchor box 518' may identify the ROI 516 within the biomedical image 514. The adjusted anchor boxes 518' may be different in location from the initial anchor box 520 on the biomedical image 514.

Furthermore, as the model applier 325 feeds the feature map 518' through the box selector 510, the box selector 510 may determine whether or not to select the adjusted anchor box 518' for provision. To determine, the box selector 510 may calculate or determine a confidence score for each adjusted anchor box 518' based on the pixels of the feature map 518 from the feature extractor 502 that correspond to the adjusted anchor box 518'. The confidence score may indicate a degree of likelihood that at least one ROI 516 is represented within the portion of the feature map 518 corresponding to the adjusted anchor box 520'. Based on the confidence score, the box selector 510 may select the adjusted anchor box 520' for the output 522.

When the confidence score satisfies (e.g., greater than or equal to) a threshold, the box selector 510 may select the adjusted anchor box 520'. The threshold may delineate a value for the confidence score at which to select or not select the adjusted anchor box 520'. Otherwise, when the confidence score dose not satisfy (e.g., less than) the threshold, the box selector 510 may refrain from selecting the adjusted anchor box 520'. The use of the regression coefficients defined by the box selector 510 may be used to more accurately and precisely locate the ROI 516 in the biomedical image 514. The model applier 325 may obtain, retrieve, or otherwise identify the set of adjusted anchor boxes 520' as the output 522 from the object detection system 305. In some embodiments, the set of adjusted anchor boxes 520' outputted by the box selector 510 may be overlapping with one another within the biomedical image 514.

With the identification, the model applier 325 may feed the each adjusted anchor box 520' to the input of the instance segmentation model 340. The feeding of the adjusted anchor boxes 520' to the instance segmentation model 340 may be performed parallel to processing of additional biomedical images 514 by the object detection model 335. In some embodiments, the model applier 325 may feed a portion of each feature map 518' corresponding to the respective adjusted anchor box 520' into the input of the instance segmentation model 340. The model applier 325 may process the adjusted anchor box 520' (or the corresponding portion of the feature map 518') using the set of kernels defined in the mask head 512. In accordance with the set of kernels defined in the mask head 512, the model applier 325 may generate a predicted mask 526 for each adjusted anchor box 520'. The predicted mask 526 may define or identify at least a portion of the coordinates (e.g., pixel coordinates) corresponding to the ROI 516 within the adjusted anchor box 520'. The coordinates may be defined relative to the overall biomedical image 514 or too the associated adjusted anchor box 520'.

In some embodiments, as the model applier 325 feeds the adjusted anchor boxes 520, the mask head 512 of the instance segmentation model 340 may determine whether or not to select the predicted mask 526 for provision. In determining, the mask head 512 may calculate or determine a confidence score for each predicted mask 526 based on the pixels of the predicted mask 526. The confidence score may indicate a degree of likelihood that at least one ROI 516 is represented within the predicted mask 526. Based on the confidence score, the mask head 512 may select the predicted mask 526 for the output 522. When the confidence score satisfies (e.g., greater than or equal to) a threshold, the mask head 512 may select the predicted mask 526. Otherwise, when the confidence score dose not satisfy (e.g., less than) the threshold, the mask head 512 may refrain from selecting the predicted mask 526. In addition, the model applier 325 may unselect the adjusted anchor box 520' associated with the unselected predicted mask 526.

With the production of the output 522, the model trainer 320 may compare the output 522 with the example 405 of the training dataset 350 to determine at least one loss metric. The model trainer 320 may calculate, generate, or otherwise determine one or more loss metrics (also referred herein as localization loss) for the object detection model 335. The loss metric for the object detection model 335 may correspond to a degree of deviation between the adjusted anchor boxes 520 with the ground anchor boxes 415 and a degree of deviation between the object type 524 and the object type identified in the training dataset 350. To determine, the model trainer 320 may compare the set of adjusted anchor boxes 520' with the corresponding set of ground anchor boxes 415 for the biomedical image 514. For each adjusted anchor box 520' for a given ROI 516, the model trainer 320 may calculate or determine a difference in location (e.g., coordinates) between the adjusted anchor box 520' and the corresponding ground anchor box 415. In some embodiments, the model trainer 320 may determine a difference in location along each axis for the coordinates (e.g., x and y axes) between the two anchor boxes.

In some embodiments, the model trainer 320 (or the object classifier 508) may determine an intersection metric (e.g., an Intersection over Union (IoU)) for the initial anchor box 520 and the corresponding ground anchor box 415. The intersection metric may correspond to a number of pixels in the feature map 518 common to the initial anchor box 520 and the corresponding ground anchor box 415. Using the intersection metric, the model trainer 320 may calculate or determine a classification error of the object type 524 corresponding to the initial anchor box 520 (or adjusted anchor box 520'). In determining, the model trainer 320 may compare the intersection metric to a threshold to determine whether the ROI 516 is present in the initial anchor box 520.

When the intersection metric satisfies (e.g., greater than or equal to) the threshold, the model trainer 320 may determine that the ROI 516 is present in the initial anchor box 520. The model trainer 320 may compare the object type 524 determined by the object classifier 508 and the object type labeled by the annotation for the ground anchor box 415. If the two object types differ, the model trainer 320 may identify determination as the classification error. Otherwise, if the two object types match, the model trainer 320 may identify the determination as a correct classification. Conversely, when the intersection metric does not satisfy (e.g., greater than or equal to) the threshold, the model trainer 320 may determine that the ROI 516 is not present in the initial anchor box 520. The model trainer 320 may compare the determination by the object classifier 508 and the determination using the ground anchor box 415. If the two match, the model trainer 320 may identify the determination as a correct classification. On the other hand, if the two do not match, the model trainer 320 may identify the determination as a classification error.

Based on the comparisons, the model trainer 320 may calculate or determine the loss metric. The loss metric may be a function of the difference in location between the adjusted anchor box 520' and the corresponding ground anchor box 415 and the classification error of the object type 524 or a correct classifications, among others. The loss metric may be calculated in accordance with any number of loss functions, such as Mean Squared Error (MSE), a quadratic loss, and a cross-entropy loss, among others. In general, when the difference in location or classification error is higher, the loss metric determined by the model trainer 320 may be higher. Conversely, when the difference in location or the classification error is lower, the loss metric may be consequently lower.

Furthermore, the model trainer 320 may calculate, generator, or otherwise determine one or more loss metrics (also referred herein as mask loss) for the instance segmentation model 340. The determination of the loss metric for the instance segmentation model 340 may be similar to the determination of the loss metric for the object detection model 335. The loss metric for the instance segmentation model 340 may correspond to a degree of deviation between the predicted masks 526 and the ground truth masks 420. In determining, the model trainer 320 may compare the set of predicted masks 526 with the set of ground truth masks 420. For each predicted mask 526 for the given ROI 516, the model trainer 320 may calculate or determine a difference in location between the identification of the ROI 516 in the predicted mask 526 and the identification of the ROI 516 in the corresponding ground truth mask 420. In some embodiments, the model trainer 320 may determine a difference in location along each axis for the coordinates (e.g., x and y axes) between the predicted mask 526 and the corresponding ground truth mask 420.

In some embodiments, the model trainer 320 may determine an intersection metric (e.g., an Intersection over Union (IoU) or a mean average precision (mAP)) for each predicted box 526 and the corresponding ground truth mask 420. The intersection metric may correspond to a number of pixels identified as the ROI 516 common to the predicted mask 526 and the corresponding ground truth mask 420. Using the intersection metric, the model trainer 320 may calculate or determine a classification error of the predicted mask 526. In determining, the model trainer 320 may compare the intersection metric to a threshold to determine whether the ROI 516 is present in the predicted mask 526. The threshold may delineate a value for the intersection metric at which the ROI 516 is determined as presented in the predicted mask 516. For example, the threshold may include an IoU minimum value of 0.55-0.85. When the intersection metric satisfies (e.g., greater than or equal to) the threshold, the model trainer 320 may determine that the ROI 516 is present in the predicted mask 526. Conversely, when the intersection metric does not satisfy (e.g., greater than or equal to) the threshold, the model trainer 320 may determine that the ROI 516 is not present in the predicted mask 526.

Based on the comparisons, the model trainer 320 may calculate or determine the loss metric. The loss metric may be a function of the difference in location between the adjusted predicted mask 526 and the corresponding ground truth mask 420, as well as the intersection metric, among others. The loss metric may be calculated in accordance with any number of loss functions, such as Mean Squared Error (MSE), a quadratic loss, and a cross-entropy loss, among others. In general, when the difference in location or classification error is higher, the loss metric determined by the model trainer 320 may be higher. Conversely, when the difference in location or the classification error is lower, the loss metric may be consequently lower.

In accordance with the loss metrics, the model trainer 320 may update one or more kernels in the object detection model 335 (including the feature extractor 502, the region proposer 504, proposal generator 506, the object classifier 508, and the box selector 510) and instance segmentation model 340 (including the mask head 512). The loss metrics used to update may include the loss metric for the object detection model 335 and the loss metric for the instance segmentation model 340. The updating of weights may be in accordance with an objective function for the object detection model 335 and instance segmentation model 340. The objective function may define one or more rates or constraints at which the kernels of the object detection model 335 and instance segmentation model 340 are to be updated. For example, the model trainer 320 may use the objective function with a set learning rate, a momentum, and a weight decay for a number of iterations in training. In some embodiments, the model trainer 320 may update the one or more kernels of the object detection model 335 and instance segmentation model 340, including the feature extractor 502, the proposal generator 506, the object classifier 508, the box selector 510, and mask head 512 in unison (e.g., via back propagation). In some embodiments, the model trainer 320 may update the feature extractor 502, the proposal generator 506, the object classifier 508, the box selector 510, and the mask head 512 individually. The updating of the weights in the object detection model 335 and instance segmentation model 340 may be repeated until convergence.

Figure 5B:
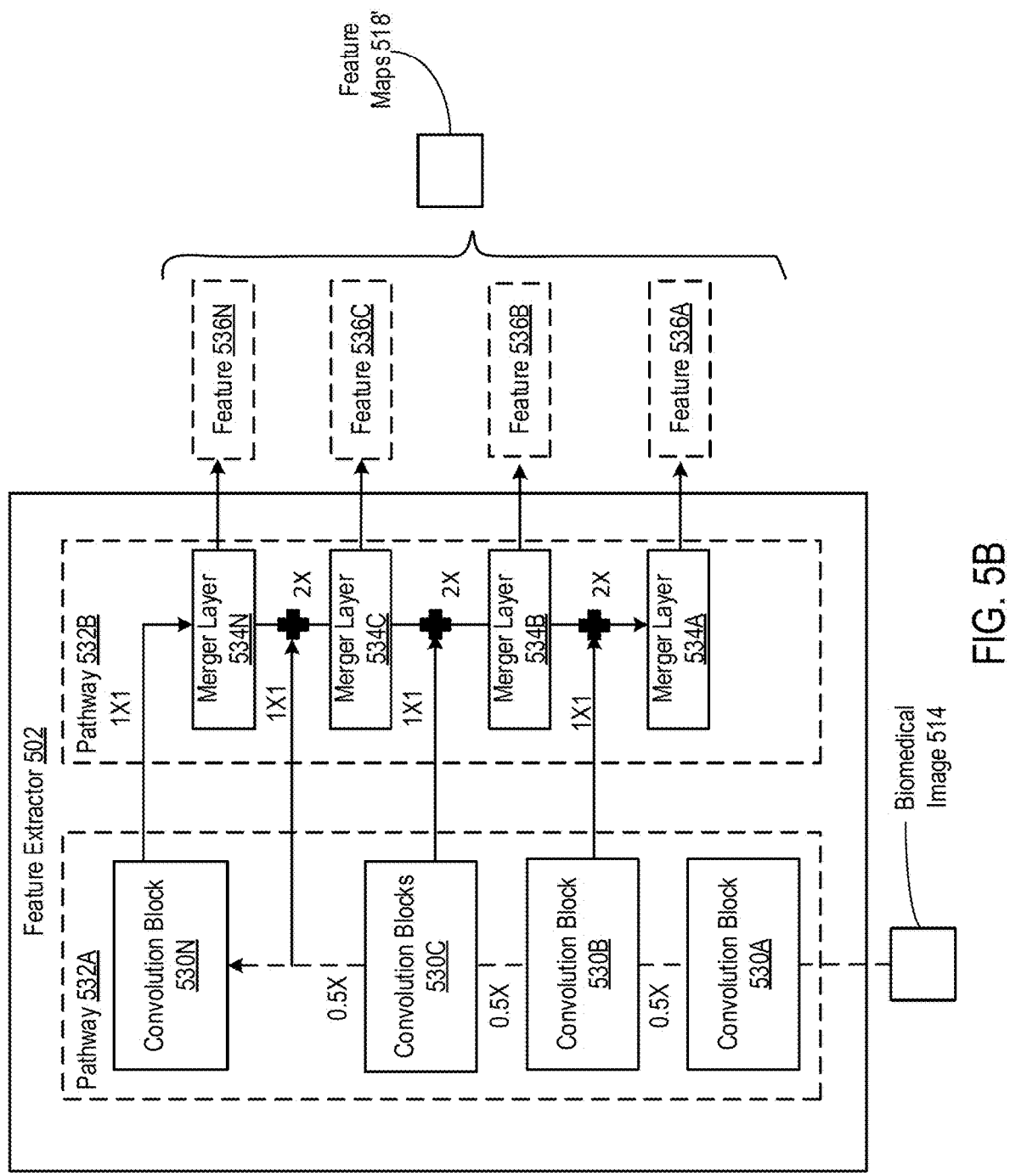
FIG. 5B depicts a block diagram of a feature extractor in the object detection model in the system in accordance with an illustrative embodiment.

Referring now to FIG. 5B, depicted is block diagram of the feature extractor 502 in the system 300 (e.g., in the object detection model 335, the instance segmentation model 340, or both). The feature extractor 502 may include at least one input and at least one output. The input of the feature extractor 502 may include the biomedical image 514. The output of the feature extractor 502 may include the feature map 518. The input (e.g., the biomedical image 514) and the output (e.g., the feature map 518) may be related via kernels as defined in a set of convolution blocks 530A-N (hereinafter generally referred to as convolution blocks 530) The set of convolution blocks 530 may be arranged in series (e.g., as depicted) or parallel configuration, or in any combination. In a series configuration, the input of one convolution stacks 530 may include the output of the previous convolution stacks 530 (e.g., as depicted). In parallel configuration, the input of one convolution stacks 530 may include the input of the entire convolution stack 530

The feature extractor 502 may include at least one first pathway 532A (sometimes referred as a bottom-up pathway) and at least one second pathway 532B (sometimes referred as a top-down pathway). The feature extractor 502 may perform a two-step process that includes a first pathway 532A and the second pathway 532B to produce the feature maps 518'. The first pathway 532A may include the set of convolution blocks 530. In the first pathway 534A, the set of convolution blocks 530 can be arranged in series (e.g., as depicted), parallel, or any combination thereof. As the pathway moves up along the first pathway 534A, the spatial dimension may be reduced (e.g., by half as depicted) at each convolution block 530. In the second pathway 532B, a 1×1 convolution filter may be applied to reduce the topmost convolutional block 530 depth to create a corresponding merger layer 534A-N (hereinafter generally referred to as merger layer 534) which will then become the output a corresponding feature 536A-N (hereinafter generally referred to as feature 536). The process may continue for the remainder of the convolution blocks 530 resulting in the feature maps 516. The feature maps 516 may include the set of features 536 produced by the merger layers 534.

Figure 5C:
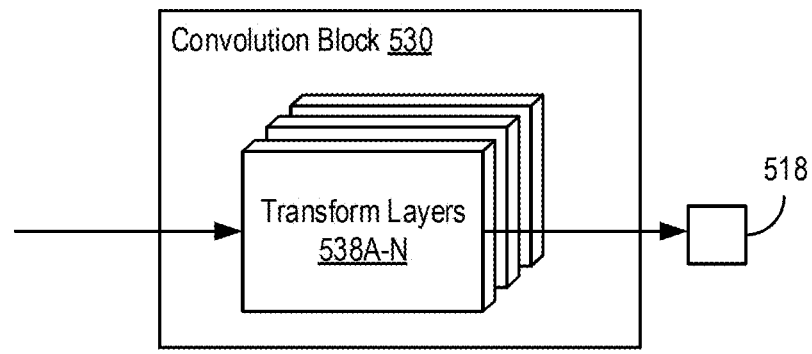
FIG. 5C depicts a block diagram of a convolution block in the feature extractor in the object detection model in the system in accordance with an illustrative embodiment.

Referring now to FIG. 5C, depicted is a block diagram of the convolution block 530 in the feature extractor in the system 300. Each convolution block 530 of the feature extractor 502 may include a set of transform layers 538A-N (hereinafter generally referred to as the set of transform layers 538). The set of transform layers 538 can include one or more kernels (sometimes herein referred to as weights or parameters) to process the input to produce or generate the feature map 518. The convolution block 530 may include at least one input and at least one output. When the convolution block 530 is the first in the feature extractor 502, the input of the convolution block 530 may include the biomedical image 514. Otherwise, the input of the convolution block 530 may include the feature map 518 generated by the previous convolution block 530. The output of the convolution block 530 may be the feature map 518.

The set of transform layers 538 in the convolution block 530 may include a convolutional layer, a normalization layer, and an activation layer (e.g., a rectified linear unit (ReLU)), among others. The set of transform layers 538 can be arranged in series, with an output of one transform layer 538 fed as an input to a succeeding transform layer 538. Each transform layer 538 may have a non-linear input-to-output characteristic. In some embodiments, the set of transform layers 538 may be a convolutional neural network (CNN). For example, the convolutional layer, the normalization layer, and the activation layer (e.g., a rectified linear unit (ReLU)) may be arranged in accordance with CNN. The kernels in the individual layers of the transform layers 538 may identify or define the relationship of the input and the output of the overall feature extractor 502.

Figure 5D:
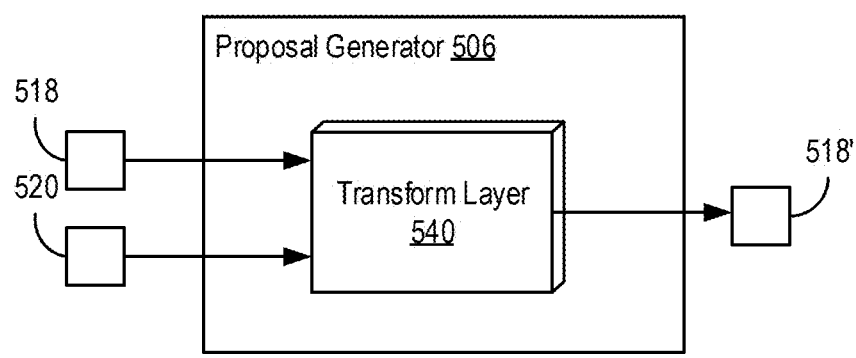
FIG. 5D depicts a block diagram of a proposal generator in the object detection model in the system in accordance with an illustrative embodiment.

Referring now to FIG. 5D, depicted is a block diagram of the proposal generator 506 in the object detection model 335 in the system 300. The proposal generator 506 may include at least one input and at least one output. The inputs of the proposal generator 506 may include the feature map 518 and at least one of a set of anchor boxes 520. The output of the proposal generator 506 may be the feature map 518'. The proposal generator 506 may include at least one transform layer 540. The inputs (e.g., the feature map 518 and anchor box 518) and the outputs (e.g., the feature map 518') may be related via kernels as defined in the transform layer 540. The transform layer 540 may include one or more kernels (sometimes herein referred to as weights or parameters) to process the input to produce or generate the feature map 518'. The transform layer 540 of the proposal generator 506 may be or correspond to a convolutional layer. The kernels in the convolutional layer of the proposal generator 506 may be, for example, a 3×3 convolution layer used to slide over the feature map 518 from the input.

Figure 5E:
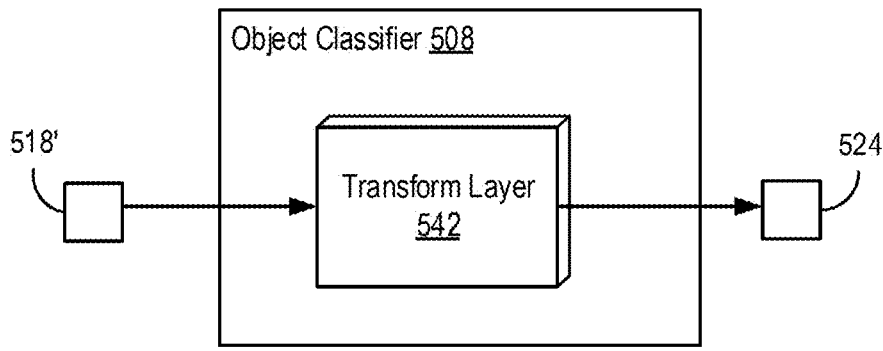
FIG. 5E depicts a block diagram of an object classifier in the object detection model in the system in accordance with an illustrative embodiment.

Referring now to FIG. 5E, depicted is a block diagram of the object classifier 508 in the system 300. The object classifier 508 may include at least one input and at least one output. The input of the object classifier 508 may include the feature map 518' generated by the proposal generator 506. The output of the proposal generator 506 may be the object type 524. The object classifier 508 may include at least one transform layer 542. The input (e.g., the feature map 518') and the output (e.g., the object type 524) may be related via kernels as defined in the transform layer 542. The transform layer 542 of the object classifier 508 may include an activation layer (e.g., a rectified linear unit (ReLU), a softmax activation function, a logistic activation function, or a radial activation function). The transform layer 542 may include one or more parameters (sometimes herein referred to as weights or kernels) in accordance with the activation function to process the feature map 518' to produce or generate the object type 524.

Figure 5F:
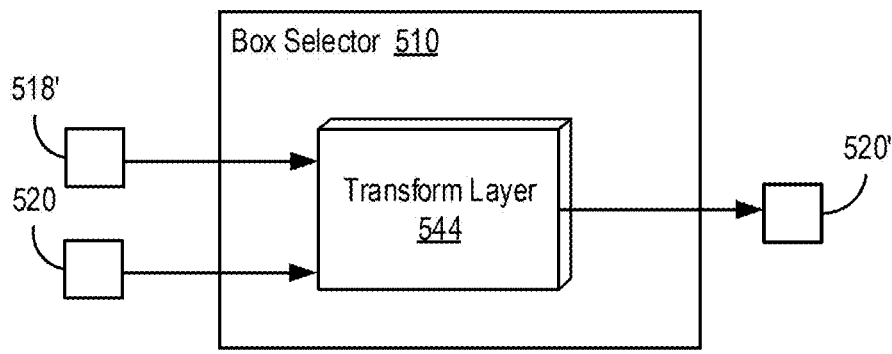
FIG. 5F depicts a block diagram of a box selector in the object detection model in the system in accordance with an illustrative embodiment.

Referring now to FIG. 5F, depicted is a block diagram of the box selector 510 in the system 300. The box selector 510 may include at least one input and at least one output. The inputs of the box selector 510 may include the feature map 518' generated by the proposal generator 506 and the set of anchor boxes 518. The output of the proposal generator 506 may be the adjusted anchor boxes 518'. The box selector 510 may include at least one transform layer 544. The inputs (e.g., the feature map 518' and the anchor box 518) and the output (e.g., the adjusted anchor box 520') may be related via parameters as defined in the transform layer 544. The transform layer 544 of the box selector 510 may include a regression layer. The regression layer of the box selector 510 may include a linear regression function, a logistic regression function, and a least squares regression function, among others. The transform layer 544 may include one or more parameters (sometimes herein referred to as weights or kernels) in accordance with the regression layer to process the feature map 518' and the initial box 518 to produce or generate the adjusted box 518'. The parameters may include one or more regression coefficients (sometimes herein referred to as adjustment factors) for defining the regression layer. The regression coefficient may be used to offset, shift, or otherwise modify a location of the initial box 518 to determine a location of the adjusted box 518' based on the pixels included in the corresponding feature map 518'.

Figure 5G:
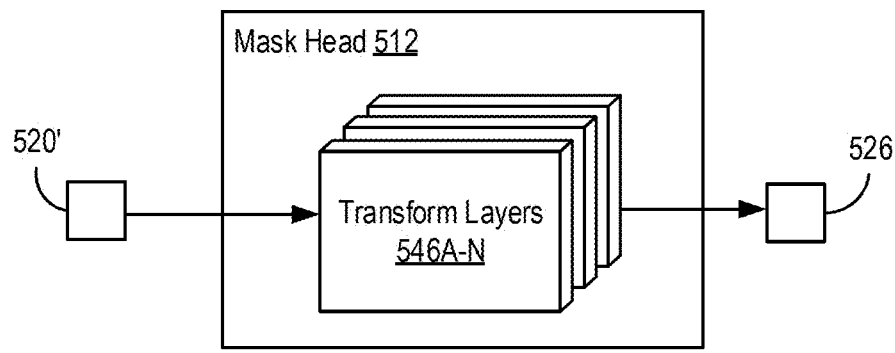
FIG. 5G depicts a block diagram of a mask head in the instance segmentation model in the system in accordance with an illustrative embodiment.

Referring to FIG. 5G, depicted is a block diagram of the mask head 512 in the instance segmentation model 340 in the system 300. The mask head 512 may include set of transform layers 546A-N (hereinafter generally referred to as the set of transform layers 546). The set of transform layers 546 can include one or more kernels (sometimes herein referred to as weights or parameters) to process the input to produce or generate the feature map 518. The mask head 512 may include at least one input and at least one output. The input of the mask head 512 may include the adjusted anchor box 520'. The output of the mask head 512 may be the predicted mask 526.

The set of transform layers 546 in the mask head 512 may include a convolutional layer, a normalization layer, and an activation layer (e.g., a rectified linear unit (ReLU)), among others. The set of transform layers 546 can be arranged in series, with an output of one transform layer 546 fed as an input to a succeeding transform layer 546. Each transform layer 546 may have a non-linear input-to-output characteristic. In some embodiments, the set of transform layers 546 may be in accordance with a decoder of a convolutional neural network (CNN). For example, the convolutional layer, the normalization layer, and the activation layer (e.g., a rectified linear unit (ReLU)) may be arranged in accordance with the CNN. The kernels in the individual layers of the transform layers 546 may identify or define the relationship of the input and the output of the mask head 512.

Figure 6:
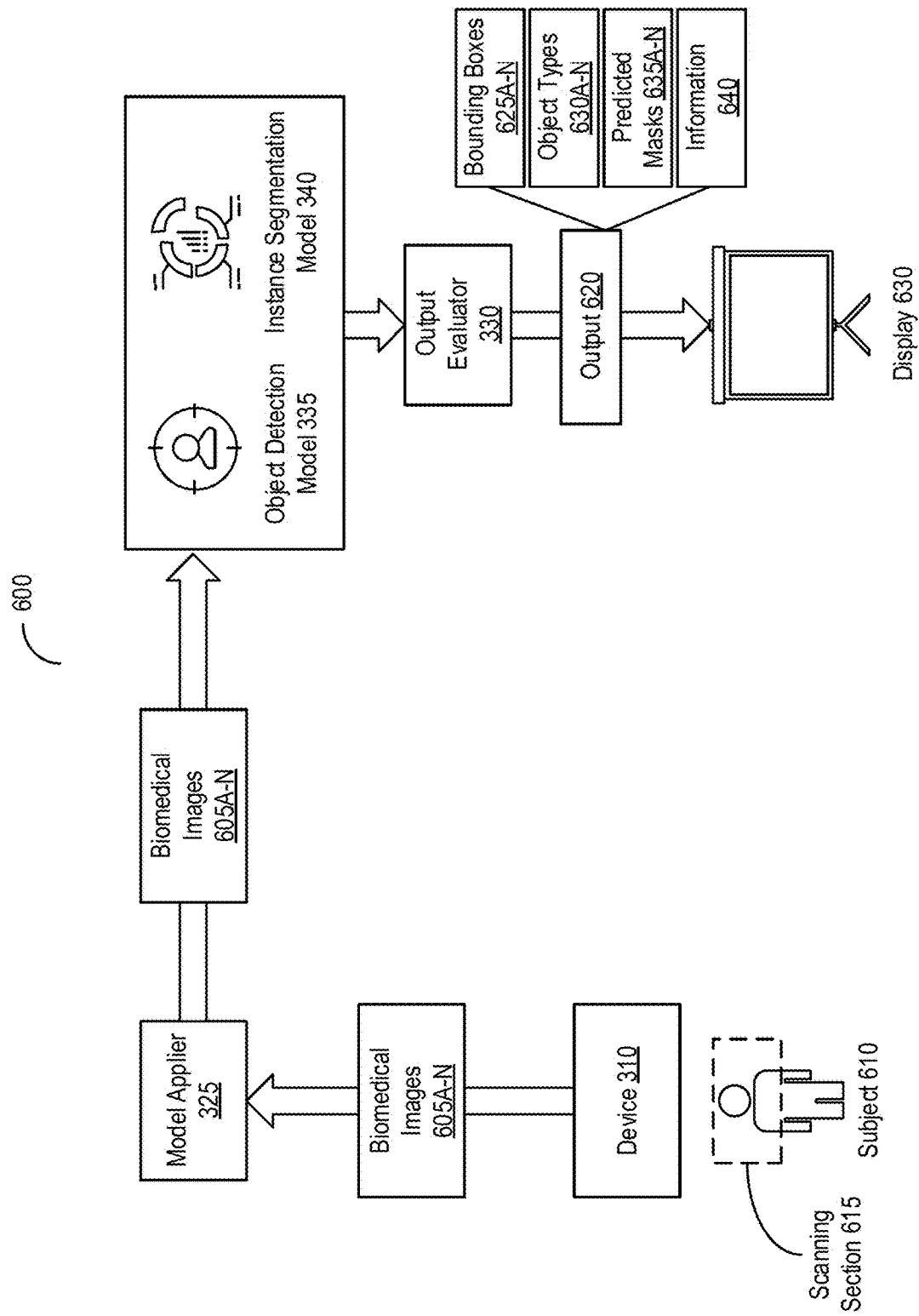
FIG. 6 depicts a sequence diagram of a process of applying an object detection model in the system for detecting ROIs in biomedical images in accordance with an illustrative embodiment.

Referring now to FIG. 6, depicted is a sequence diagram of a process 600 of applying the object detection model 335 and instance segmentation model 340 in the system 300 for detecting ROIs in biomedical image. The process 600 may be performed subsequent to the training of the object detection model 335 and instance segmentation model 340 (e.g., when convergence is reached). As depicted, the model applier 325 may retrieve, identify, or receive one or more biomedical images 605A-N (hereinafter generally referred to as biomedical images 605) from the device 310. The device 310 may be used to acquire the biomedical image 605 from a subject 610 (e.g., a human). In some embodiments, the device 310 may acquire the biomedical image 605 of a scanning section 615 within the subject 610 in accordance with an imaging technique relying on an electromagnetic radiation. The electromagnetic radiation may be in the form of an X-ray, including soft X-ray, hard X-ray, or gamma ray, among others. The scanning section 615 may, for example, correspond to a cross-section (when the biomedical image 605 is two-dimensional) or a volume (when three-dimensional) of a vertebral column of the subject 610. The biomedical image 605 may be acquired from the subject 610 prior to surgery, during surgery, or subsequent to surgery. For example, the first biomedical image 605A may be acquired before surgery (e.g., a day or two in advance), the second biomedical image 605B may be taken during surgery, and the third biomedical image 605C may be captured after surgery (e.g., between on the day of to within a month).

Upon receipt, the model applier 325 may apply the biomedical image 605 to the object detection system 305. The object detection model 335 and instance segmentation model 340 may have been trained as discussed above, and the application of the biomedical image 605 to the object detection model 335 and instance segmentation model 340 may be similar as the description above with respect to the biomedical image 410 or 512. In applying, the model applier 325 may process the biomedical image 605 in accordance with the kernel layers of the trained object detection model 335 and instance segmentation model 340. By processing, the model applier 325 may generate at least output 620. The output 620 may include a set of bounding boxes 625A-N (hereinafter generally referred to as bounding boxes 625), a set of object types 630A-N (hereinafter generally referred to as object types 630), or a set of predicted masks 635A-N, among others.

Each bounding box 625 may identify an outline (e.g., a rectangular outline) corresponding ROI in the biomedical image 605. Each object type 630 may identify a classification of the corresponding ROI in the biomedical image 605 and may be associated with a respective bounding box 625. Each predicted mask 635 may identify coordinates (e.g., pixel coordinates) corresponding to the ROI in the biomedical image 605 within an associated bounding box 625. The bounding boxes 625 may be produced by the object detection model 335 and instance segmentation model 340 in the same manner as described above with respect to the adjusted anchor boxes 518 using the biomedical image 514. Likewise, the object type 630 may be produced by the object detection model 335 and instance segmentation model 340 in the same manner as described above with respect to the object types 524 using the biomedical image 514. Furthermore, the predicted masks 635 may be generated by the instance segmentation model 340 as detailed above with respect to the predicted masks 526 and the biomedical image 514. The model applier 325 may identify the output 620 generated by the object detection model 335 and instance segmentation model 340.

The output evaluator 330 executing on the object detection system 305 may provide or generate information 640 using the set of bounding boxes 625 and the set of object types 630 from the output 620 for the inputted biomedical image 605. In some embodiments, the information 630 may include a distance between each pair of ROIs identified in the biomedical image 605. For example, the distance may identify a distance between a centroid of each vertebra within the spinal column of the subject 610 as depicted in the biomedical image 605. The output evaluator 330 may identify a centroid (e.g., using x-y coordinates relative to the biomedical image 605) of each bounding box 625 produced by the object detection model 335 or each predicted mask 635 generated by the instance segmentation model 340. For each pair of bounding boxes 625, the output evaluator 330 may calculate or determine a difference between the respective centroids. Based on the differences, the output evaluator 330 may identify pairs of adjacent bounding boxes 625 (e.g., nearest neighbor) and use the corresponding differences as the distance between each pair of ROIs.

In some embodiments, the output evaluator 330 may generate the information 640 using the outputs 620 generated over multiple biomedical images 605. The biomedical images 605 may be acquired from the same subject 610 but using different acquisition parameters (e.g., angles, brightness, focus, contrast, and magnification levels) or at different times (e.g., pre-surgery, mid-surgery, or post-surgery). In some embodiments, the information 640 may identify a difference (or movement) in position for each ROI identified across the biomedical images 605. Across the set of biomedical image 605, the output evaluator 330 may identify a centroid (e.g., x and y coordinates) of the corresponding bounding box 625 produced by the object detection model 335 or the predicted mask 635 generated by the instance segmentation model 340. The centroid may correspond, for example, to the same disc in the spinal column pictured in the set of biomedical images 605. For the corresponding bounding box 625 across the set, the output evaluator 330 may calculate or determine the difference in position. In some embodiments, the output evaluator 330 may generate other information for presentation, such as spine structure, implant related information, patient demographic data, and other pathology related data, among others.

With the generation, the output evaluator 330 may provide the output 620. In some embodiments, the output evaluator 330 may provide the output 620 for presentation on a display 630. The display 630 may be part of the object detection system 305 or another computing device (e.g., the device 310) communicatively coupled with the object detection system 305. The display 630 may present or render the output 620 upon receipt. The presentation of the output 620 may be in accordance with the instructions included in the output 620 from the output evaluator 330. For example, the output evaluator 330 may include instructions for the display 630 to present the biomedical image 605 along with the bounding boxes 625 using an overlay (e.g., a rectangular outline) and text identifying the object type 630 and information 640. In addition, the display 630 may present the predicted mask 635 using an overlay (e.g., semi-transparent coloring) over the corresponding pixel coordinates.

Figure 7:
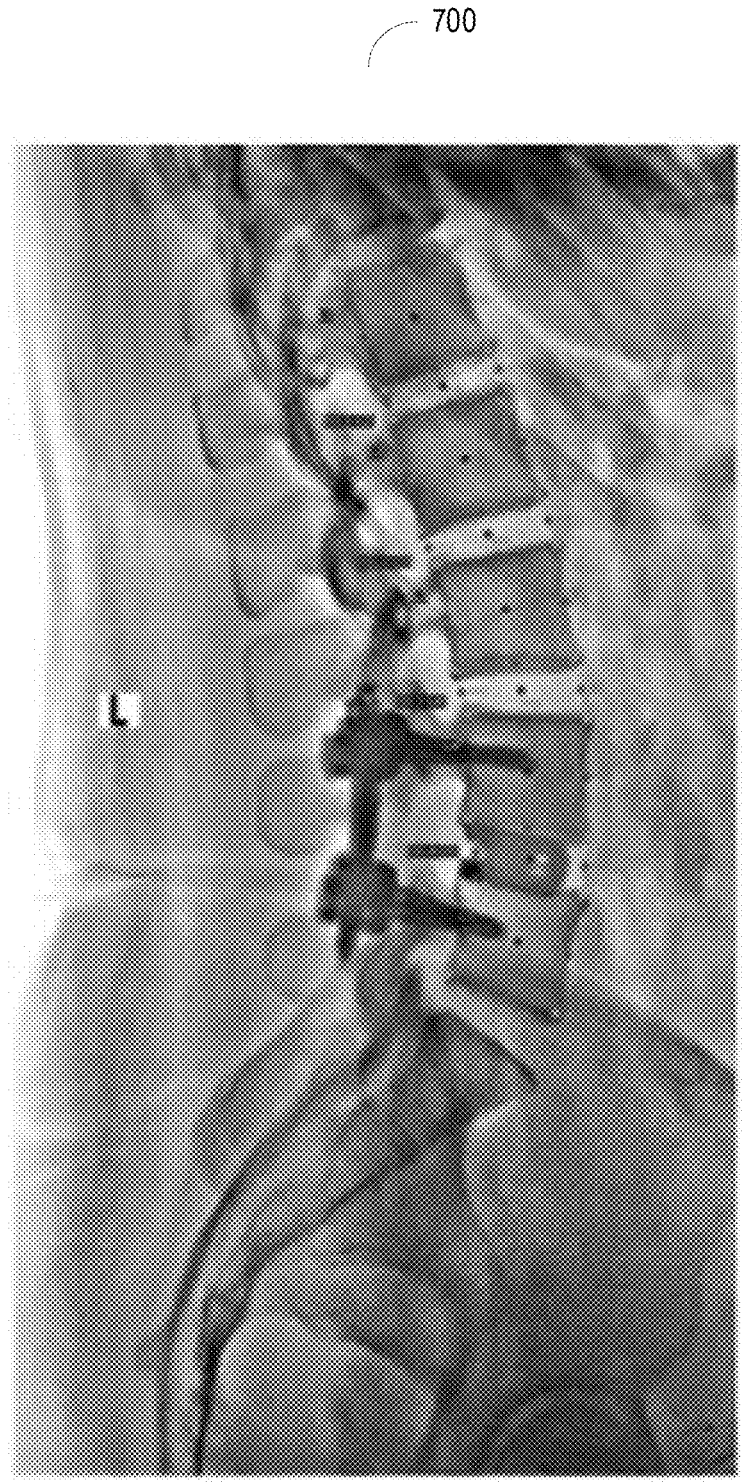
FIG. 7 depicts a screenshot of an example output from the system for detecting ROIs in biomedical images in accordance with an illustrative embodiment.

Referring now to FIG. 7, depicted is a screenshot 700 of an example output from the system 300 for detecting ROIs in biomedical images. The screenshot 700 may correspond to the rendering the output 620 on the display 630 as provided by the output evaluator 330. As depicted, the screenshot 700 may be of an x-ray scan of a vertebral column of a subject. The screenshot 700 may identify a set of vertebra discs and a set of implants in the vertebral column using different colors. In addition, the screenshot 700 may identify the pixel coordinates of an outline of each vertebra disc (e.g., using circles as depicted).

Figure 8:
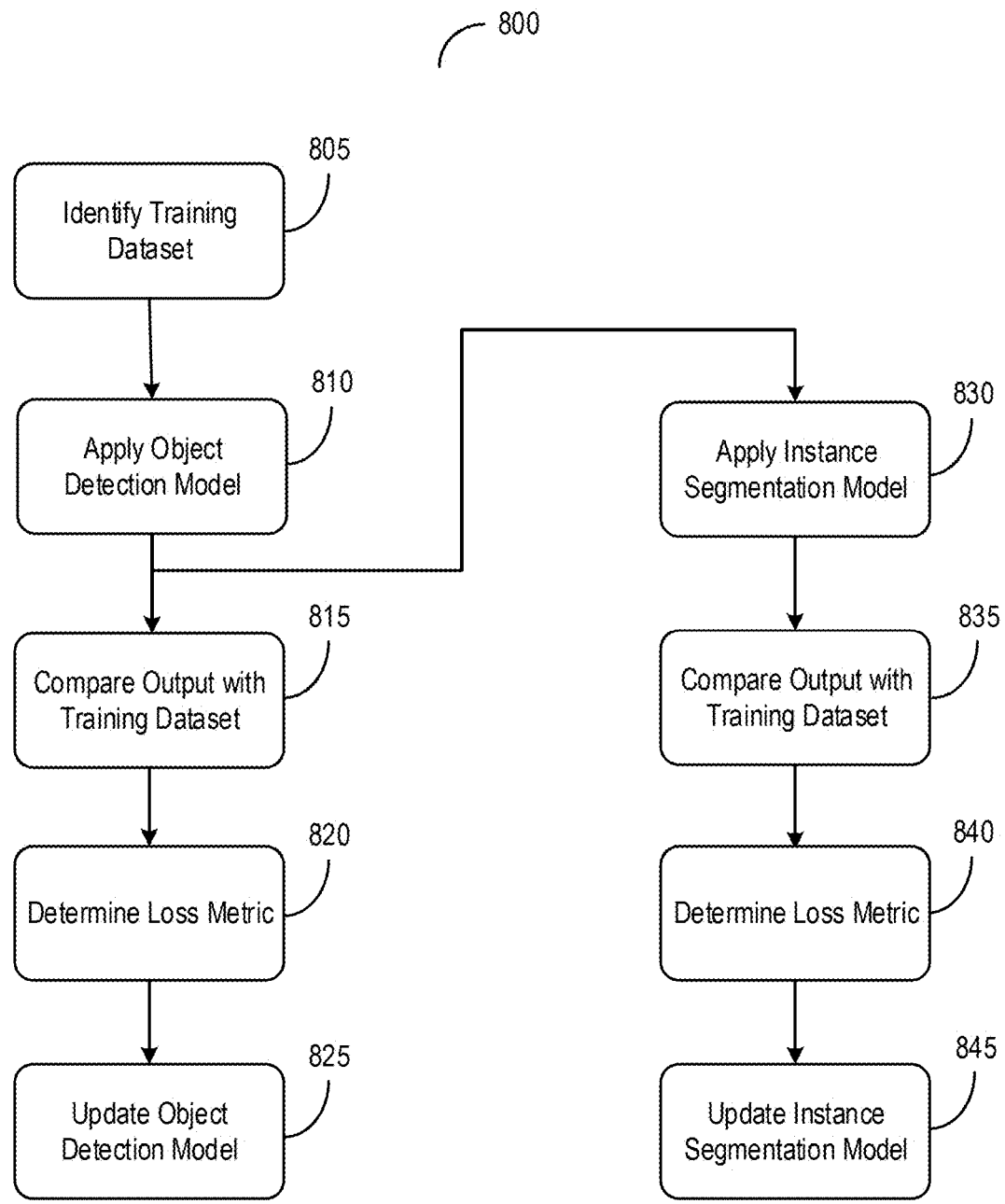
FIG. 8 depicts a flow diagram of a method of training models to detect and segment objects in biomedical images in accordance with an illustrative embodiment.

Referring now to FIG. 8, depicted is a flow diagram of a method 800 training models to detect and segment the objects in biomedical images. The method 800 may be implemented using or performed by any of the components described herein. In brief overview, a computing system may identify a training dataset (805). The computing system may apply an object detection model (810). The computing system may compare an output with the training dataset for the object detection model (815). The computing system may determine a loss metric for the object detection model (820). The computing system may update the object detection model (825). The computing system may apply an instance segmentation model (830). The computing system may compare the output with the training dataset (835). The computing system may determine a loss metric for the instance segmentation model (840). The computing system may update the instance segmentation model (845).

In further detail, a computing system (e.g., the object detection system 305) may identify a training dataset (e.g., the training dataset 350) (805). The training dataset may include a biomedical image (e.g., the sample biomedical image 410) and a set of ground truth boxes (e.g., the set of ground anchor boxes 415). The biomedical image may be derived from a scan (e.g., X-ray) of a sample, and may have one or more ROIs corresponding to objects in the sample. The ground of truth boxes may identify the ROIs within the biomedical image.

The computing system may apply object detection model and instance segmentation model to the biomedical image (810). The object detection system 305 may include a set of kernels defined via a feature extractor (e.g., the feature extractor 502), a proposal generator (e.g., the proposal generator 506), an object classifier (e.g., the object classifier 508), and a box selector 510 (e.g., the box selector 510). In applying, the computing system may process the biomedical image in accordance with a set of kernels in the object detection system 305 to produce an output (e.g., the output 425). The output may include bounding boxes (e.g., the bounding boxes 430) and corresponding object types (e.g., the object types 435). Each bounding box may identify the ROI in the biomedical image and each object type may identify a classification of the object depicted in the ROI.

The computing system may compare the output with the training dataset (815). For each bounding box, the computing system may compare with the ground truth box to determine a difference in position. In addition, the computing system may determine an intersection between each bounding box and the ground truth box for a given ROI. Using the interaction, the computing system may determine whether the object type classified for the anchor box is incorrect or correct.

The computing system may determine a loss metric (830). Based on the comparison, the computing system may calculate the loss metric. The loss metric may be a function of the difference in positions between the ground truth box and the bounding boxes and the classification errors for the error types. The computing system may update the object detection model (825). Using the loss metric, the computing system may modify one or more of the kernels in the object detection model, such as the kernels in the feature extractor, the proposal generator, the object classifier, or the box selector.

The computing system may apply an instance segmentation model (e.g., the instance segmentation model 340) (830). The instance segmentation may include a set of kernels defined via a mask head (e.g., the mask head 512). In some embodiments, the computing system may apply the instance segmentation model in parallel with the application of the object detection model. The object detection model may detect an area (e.g., an anchor box) containing the ROI (e.g., the implant region), whereas the instance segmentation model may identify the individual pixels corresponding to the ROI within the area. In applying, the computing system may process each bounding box or a portion of the biomedical image corresponding to each bounding box in accordance with the kernels of the mask head. The bounding boxes may be produced by the object detection model. From processing, the computing system may produce a predicted mask (e.g., the predicted masks 526) for each bounding box.

The computing system may compare the output with the training dataset (835). The computing system may compare the predicted mask generated by the instance segmentation model with ground truth masks (e.g., the ground truth masks 420) of the training dataset. The computing system may determine a loss metric for the instance segmentation model (840). Based on the comparison, the computing system may generate the loss metric for the instance segmentation model. The loss metric may correspond to a degree of deviation between the ground truth mask and the associated predicted mask. The computing system may update the instance segmentation model (845). Using the loss metric, the computing system may modify one or more of the kernels in the instance segmentation model, including the kernels of the instance segmentation model.

Figure 9:
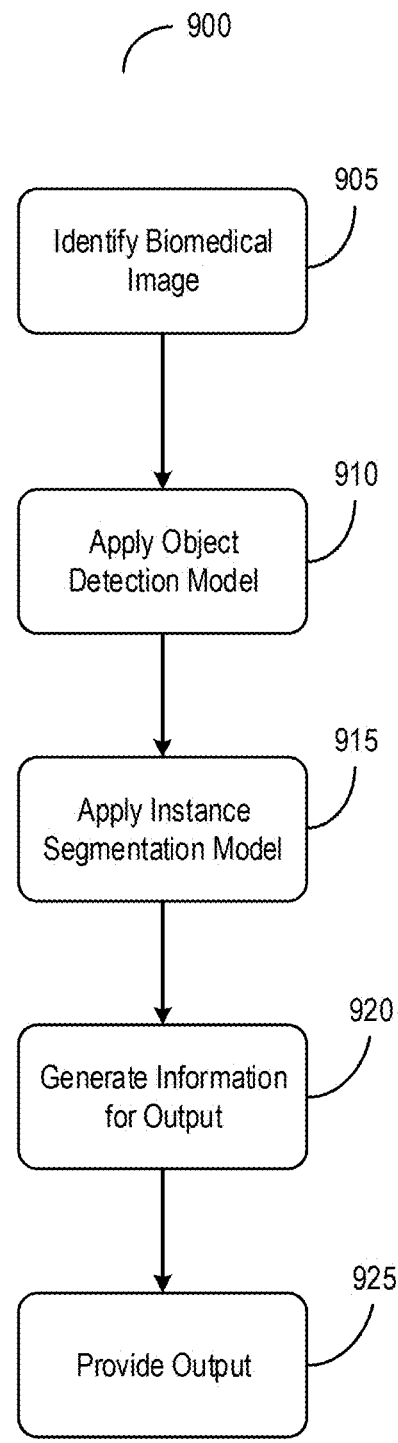
FIG. 9 depicts a flow diagram of a method of detecting and segmenting objects in biomedical images using the model in accordance with an illustrative embodiment.

Referring now to FIG. 9 depicts is a flow diagram of a method 900 of detecting objects in biomedical images using a model. The method 900 may be implemented using or performed by any of the components described herein. In brief overview, a computing system may identify a biomedical image (905). The computing system may apply an object detection model (910). The computing system may apply an instance segmentation model (915). The computing system may generate information based on output (920). The computing system may provide the output (925).

In further detail, a computing system (e.g., the object detection system 305) may identify a biomedical image (e.g., the biomedical image 605) (905). The biomedical image may be acquired from a scanning section (e.g., the scanning section 615) of a subject (e.g., the subject 610) in accordance with an imaging technique relying on electromagnetic radiation (e.g., X-ray). The biomedical image may be acquired before surgery on the subject, while the subject is undergoing surgery, or after the subject has completed the surgery.

The computing system may apply an object detection model (e.g., the object detection model 335) (910). The object detection model may include a set of kernels defines via a feature extractor (e.g., the feature extractor 502), a proposal generator (e.g., the proposal generator 506), an object classifier (e.g., the object classifier 508), and a box selector 510 (e.g., the box selector 510). In applying, the computing system may feed the biomedical image to the model 920 and model 925, may process the biomedical image in accordance with the kernels defined in the object detection system 305. From processing, the computing system may generate at least one output (e.g., the output 620).

The output may include a set of bounding boxes (e.g., the bounding boxes 625), and a set of object types (e.g., the object types 630). Each bounding box may identify the ROI in the biomedical image and each object type may identify the classification and segmentation of the object depicted in the ROI.

The computing system may apply an instance segmentation model (e.g., the instance segmentation model 340) (915). The instance segmentation may include a set of kernels defined 7 via a mask head (e.g., the mask head 512). In applying, the computing system may process each bounding box or a portion of the biomedical image corresponding to each bounding box in accordance with the kernels of the mask head. The bounding boxes may be produced by the object detection model. From processing, the computing system may produce a predicted mask (e.g., the predicted masks 526) for each bounding box. The predicted mask may be included in the output.

The computing system may generate information (e.g., the information 640) based on the output (920). The information may be generated based on the bounding boxes and the object type. The computing system may identify four landmarks on the predicted mask. Then the system may identify the mid points of the adjacent landmarks. Intersection of these midpoints are considered as the centroid of the predicted mask. Using centroids, the computing system may calculate a difference in position of the corresponding ROIs. The computing system may provide the output (930). The computing system may present or render the output onto a display (e.g., the display 630). The display (e.g., the screenshot 700) may include the biomedical image itself, rectangular outlines for each bounding box, and textual indicators for the object types and the information.

Although a few embodiments have been described in detail in this disclosure, it should be readily appreciated that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the various embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the embodiments without departing from the spirit of the present disclosure.

What is claimed is:

1. A method of detecting regions of interests (ROIs) in biomedical images, comprising:
   identifying, by one or more processors, a biomedical image derived from a sample, the biomedical image having at least one ROI corresponding to an object in the sample;
   applying, by the one or more processors, a model to the biomedical image, the model comprising:
      a feature extractor configured to generate a feature map using the biomedical image, the feature map having a plurality of pixels;
      a region proposer configured to
         generate an anchor box outlining a portion of the plurality of pixels in the feature map corresponding to the ROI in the biomedical image; and
      a mask head to identify, within the anchor box, a segment of the biomedical image identifying the ROI; and
   providing, by the one or more processors, an output based on the segment to identify the ROI in the biomedical image.

2. The method of claim 1, further comprising determining, by the one or more processors, a distance between the anchor box for identifying the ROI and a second anchor box for identifying a second ROI in the biomedical image,
   wherein providing the output further comprises providing information on the distance between the ROI and the second ROI.

3. The method of claim 1, wherein the region proposer is further configured to determine, based on the plurality of pixels of the feature map, an object type for the object corresponding to the ROI; and
   wherein providing the output further comprising providing information identifying the object type of the object corresponding to the ROI in the biomedical image.

4. The method of claim 1, wherein the region proposer is further configured to:
   determine, for each anchor box of a plurality of anchor boxes, a confidence score that the ROI is present in the anchor box based on the plurality of pixels; and
   select, from the plurality of anchor boxes, the anchor box for provision based on the confidence score,
   wherein providing the output further comprises providing information identifying dimensions of the anchor box corresponding to dimensions of the object from which the biomedical image is derived.

5. The method of claim 1, wherein the feature extractor is further configured to filter the biomedical image based on at least one of a shape or a color identified as corresponding to the object to generate the feature map.

6. The method of claim 1, wherein the biomedical image is derived from an X-ray scan of a vertebral column of a subject prior to, concurrent with, or subsequent to an operation, the ROI of the biomedical image corresponding to a disc in the vertebral column,
   wherein providing the output further comprising providing an overlay to indicate the at least one of the anchor box or segment to identify the disc corresponding to the ROI in the biomedical image.

7. The method of claim 1, further comprising training, by the one or more processors, the model using a training dataset, the training dataset comprising an example biomedical image derived from an example sample, a ground anchor box outlining at least one ROI corresponding to an object of the example sample, and a ground truth mask identifying the ROI corresponding to the object in the ground anchor box.

8. A method of training models to detect objects in biomedical images, comprising:
   identifying, by one or more processors, a training dataset, the training dataset comprising:
      a biomedical image derived from a sample, the biomedical image having at least one ROI corresponding to an object in the sample; and
      a ground anchor box labeling the at least one ROI corresponding to the object;
   applying, by the one or more processors, a model to the biomedical image, the model comprising:
      a feature extractor configured to generate a feature map using the biomedical image, the feature map having a plurality of pixels;
      a region proposer configured to generate an anchor box outlining a portion of the plurality of pixels in the feature map to identify the ROI in the biomedical image; and comparing, by the one or more processors, the anchor box with the ground anchor box to determine a loss metric; and updating, by the one or more processors, at least one kernel of the feature extractor or the region proposer in the model based on the loss metric.

9. The method of claim 8, wherein the training dataset further comprises a ground segment labeling the at least one ROI within ground anchor box for the biomedical image, and further comprising:

applying, by the one or more processors, a mask head of the model to the anchor box to identify a segment of the biomedical image within the anchor box corresponding to the ROI;

comparing, by the one or more processors, the segment identified by the mask head and the ground segment to determine a second loss metric; and updating, by the one or more processors, at least one second kernel of the mask head based on the second loss metric.

10. The method of claim 8, wherein the region proposer of the model is further configured to:

generate an intersection metric based on comparing the anchor box with the ground anchor box; and determine, based on the intersection metric, whether the ROI is present in the anchor box.

11. The method of claim 8, wherein the region proposer of the model is further configured to:

identify, from a plurality of anchor boxes, a subset of anchor boxes based on an intersection metric between each anchor box of the subset and the ground anchor box; and determine, for each anchor box of the subset of anchor boxes, a confidence score that the ROI is present in the anchor box based on the plurality of pixels in the anchor box; and select, from the plurality of anchor boxes, the anchor box for provision based on the confidence score.

12. The method of claim 8, wherein updating the at least one kernel further comprises updating the at least one kernel of the feature extractor to filter the biomedical image based on at least one of a shape or a color identified as corresponding to the object to generate the feature map.

13. The method of claim 8, wherein the biomedical image of the training dataset is derived from an X-ray scan of a vertebral column of a subject prior to, concurrent with, or subsequent to an operation, the ROI of the biomedical image corresponding to a disc in the vertebral column.

14. The method of claim 8, further comprising applying, by the one or more processors subsequent to convergence of the model, the model to a second biomedical image acquired via a scan of a second sample to identify at least one second ROI corresponding to a second object in the second sample in the second biomedical image.

15. A system for detecting regions of interest (ROIs) in biomedical images, comprising:

one or more processors coupled with memory configured to:

identify a biomedical image derived from a sample, the biomedical image having at least one ROI corresponding to an object in the sample;

apply an object detection model to the biomedical image, the object detection model comprising:

a feature extractor configured to generate a feature map using the biomedical image, the feature map having a plurality of pixels;

a region proposer configured to:

identify a first portion of the plurality of pixels in the feature map within a first anchor box;

determine, based on the plurality of pixels in the first anchor box, whether the ROI is present in the first anchor box; and generate, in accordance with an adjustment factor, a second anchor box corresponding to a second portion of the plurality of pixels in the feature map to identify the ROI in the biomedical image; and apply an instance segmentation model to the second anchor box to identify a segment of the biomedical image within the second anchor box corresponding to the ROI; and provide an output based on at least one of the second anchor box or the segment to identify the ROI in the biomedical image.

16. The system of claim 15, wherein the region proposer of the object detection model is further configured to determine a distance between the second anchor box for identifying the ROI and a third anchor box for identifying a second ROI in the biomedical image; and wherein the one or more processors are further configured to provide information on the distance between the ROI and the second ROI.

17. The system of claim 15, wherein the region proposer of the object detection model is further configured to determine, based on the plurality of pixels in the first anchor box, an object type for the object corresponding to the ROI present in the first anchor box; and wherein the one or more processors are further configured to provide information identifying the object type of the object corresponding to the ROI in the biomedical image.

18. The system of claim 15, wherein the region proposer of the object detection model is further configured to:

determine, for each anchor box of a plurality of anchor boxes, a confidence score that the ROI is present in the anchor box based on the plurality of pixels in the anchor box; and select, from the plurality of anchor boxes, the second anchor box for provision based on the confidence score, and wherein the one or more processors are configured to provide information identifying dimensions of the second anchor box corresponding to dimensions of the object from which the biomedical image is derived.

19. The system of claim 15, wherein the biomedical image is derived from an X-ray scan of a vertebral column of a subject prior to, concurrent with, or subsequent to an operation, the ROI of the biomedical image corresponding to a disc in the vertebral column, wherein the one or more processors are configured to provide an overlay to indicate the second anchor box to identify the disc corresponding to the ROI in the biomedical image.

20. The system of claim 15, wherein the one or more processors are configured to train the object detection model using a training dataset, the training dataset comprising an example biomedical image derived from an example sample and a ground anchor box labeling at least one ROI corresponding to an object of the example sample.

\* \* \* \* \*